(12) United States Patent
Li et al.

(10) Patent No.: US 10,681,708 B2
(45) Date of Patent: Jun. 9, 2020

(54) SUBSLOT BUNDLING AND ACKNOWLEDGEMENT

(71) Applicant: QUALCOMM Incorporated, San Diego, CA (US)

(72) Inventors: Chong Li, Weehawken, NJ (US); Junyi Li, Chester, NJ (US); Hao Xu, Beijing (CN); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/789,489

(22) Filed: Oct. 20, 2017

(65) Prior Publication Data

US 2018/0176922 A1    Jun. 21, 2018

Related U.S. Application Data

(60) Provisional application No. 62/435,518, filed on Dec. 16, 2016.

(51) Int. Cl.
*H04W 72/08* (2009.01)
*H04W 52/14* (2009.01)
(Continued)

(52) U.S. Cl.
CPC ......... *H04W 72/082* (2013.01); *H04L 1/1664* (2013.01); *H04L 5/0032* (2013.01); *H04L 5/0055* (2013.01); *H04W 52/143* (2013.01); *H04W 52/243* (2013.01); *H04W 72/0413* (2013.01); *H04L 1/0068* (2013.01);
(Continued)

(58) Field of Classification Search
CPC ... H04L 1/0068; H04L 1/1664; H04L 1/1887; H04L 2001/0092; H04L 5/0032; H04L 5/0055; H04W 72/0413; H04W 72/0426; H04W 72/082; H04W 72/085
See application file for complete search history.

(56) References Cited

U.S. PATENT DOCUMENTS

2005/0013263 A1    1/2005   Kim et al.
2013/0080851 A1    3/2013   Timner et al.
(Continued)

OTHER PUBLICATIONS

International Search Report and Written Opinion—PCT/US2017/057907—ISA/EPO—dated Apr. 16, 2018.
(Continued)

*Primary Examiner* — Jean A Gelin
(74) *Attorney, Agent, or Firm* — Arent Fox, LLP

(57) ABSTRACT

A first apparatus may puncture, in at least two subslots, a first type of data or control information with a second type of data or control information. The first apparatus may bundle the least two subslots within a subframe, and the subframe may include a portion for carrying acknowledgment (ACK)/negative acknowledgment (NACK) information associated with the second type of data or control information. The first apparatus may communicate with a user equipment (UE) during the at least two subslots within the subframe. A second apparatus may receive ACK/NACK information associated with a second type of data or control information. The second apparatus may reduce a transmission power for a first type of data or control information during a subsequent subframe when the ACK/NACK information indicates a negative acknowledgement.

35 Claims, 17 Drawing Sheets

(51) Int. Cl.
  *H04L 1/16*   (2006.01)
  *H04W 52/24*  (2009.01)
  *H04L 5/00*   (2006.01)
  *H04W 72/04*  (2009.01)
  *H04L 1/00*   (2006.01)
  *H04L 1/18*   (2006.01)

(52) U.S. Cl.
  CPC .... *H04L 1/1887* (2013.01); *H04L 2001/0092* (2013.01); *H04W 72/0426* (2013.01); *H04W 72/085* (2013.01)

(56) References Cited

U.S. PATENT DOCUMENTS

| | | | |
|---|---|---|---|
| 2013/0295983 A1 | 11/2013 | Kim et al. | |
| 2013/0322397 A1* | 12/2013 | Lee | H04W 56/0045 370/329 |
| 2016/0065345 A1* | 3/2016 | Kim | H04L 5/0035 370/330 |
| 2018/0035459 A1* | 2/2018 | Islam | H04L 5/0096 |
| 2018/0070341 A1* | 3/2018 | Islam | H04W 72/042 |
| 2018/0083758 A1* | 3/2018 | Islam | H04W 72/044 |
| 2018/0213530 A1* | 7/2018 | Mochizuki | H04W 72/12 |
| 2018/0242317 A1* | 8/2018 | Marinier | H04W 72/042 |
| 2019/0268938 A1* | 8/2019 | Zhao | H04W 72/046 |
| 2019/0327012 A1* | 10/2019 | Park | H04W 4/06 |
| 2019/0334684 A1* | 10/2019 | Kwak | H04L 5/0057 |

OTHER PUBLICATIONS

Partial International Search Report—PCT/US2017/057907—ISA/EPO—dated Feb. 7, 2018.

\* cited by examiner

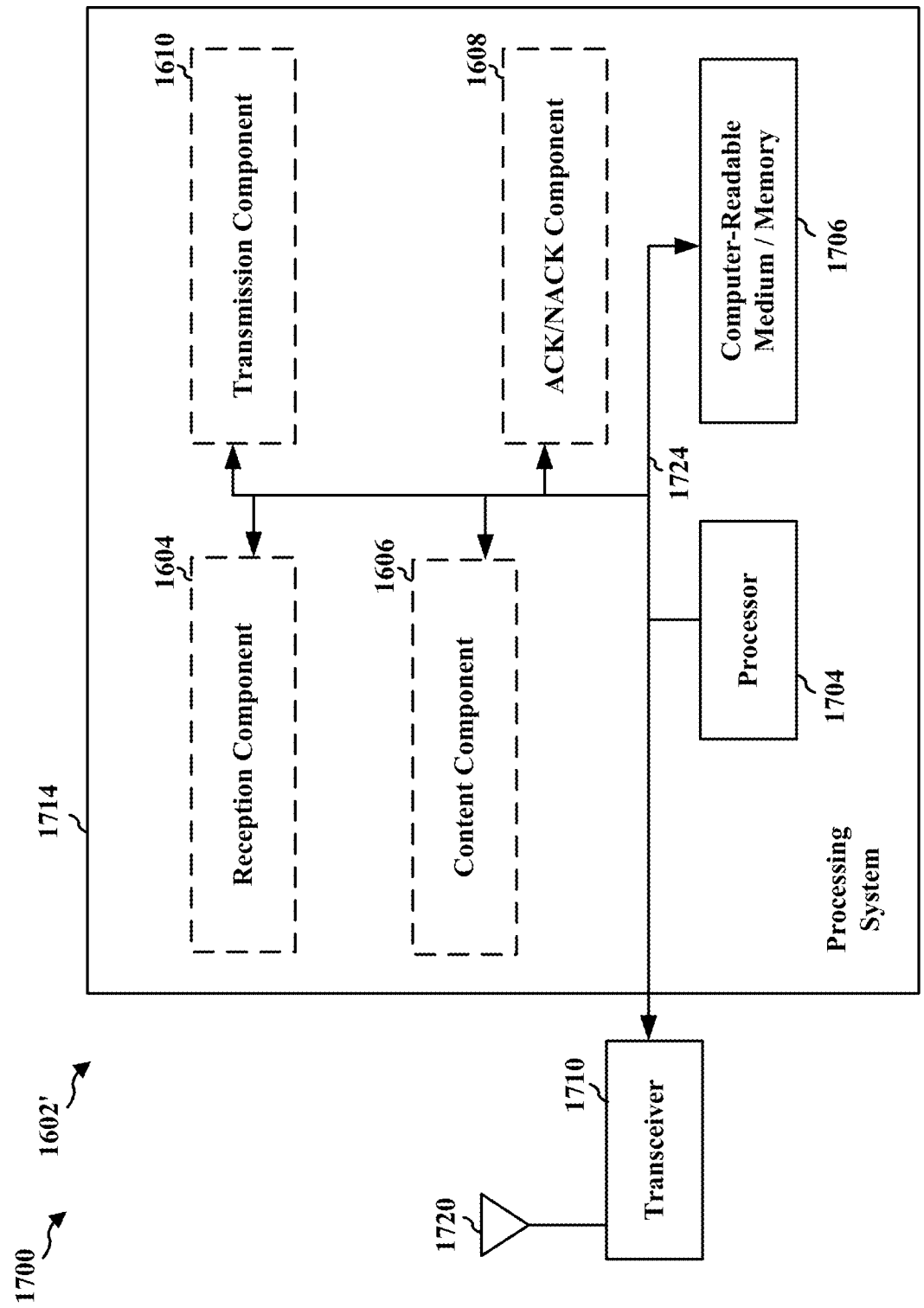

SUBSLOT BUNDLING AND ACKNOWLEDGEMENT

CROSS-REFERENCE TO RELATED APPLICATION(S)

This application claims the benefit of U.S. Provisional Application Ser. No. 62/435,518, entitled "SUBSLOT BUNDLING AND ACKNOWLEDGEMENT" and filed on Dec. 16, 2016, which is expressly incorporated by reference herein in its entirety.

BACKGROUND

Field

The present disclosure relates generally to communication systems, and more particularly, to a base station configured to bundle subslots.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

An example of an improvement to LTE may include fifth generation wireless systems and mobile networks (5G). 5G is a telecommunications standard that may extend beyond LTE and/or 4G standards. For example, 5G may offer higher capacity and, therefore, serve a larger number of users in an area. Further, 5G may improve data consumption and data rates.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a first method, a first computer-readable medium, and a first apparatus are provided. The first apparatus may puncture, in at least two subslots, a first type of data or control information with a second type of data or control information. The first apparatus may bundle the least two subslots within a subframe, and the subframe may include a portion for carrying acknowledgment (ACK)/negative acknowledgment (NACK) information associated with the second type of data or control information. The first apparatus may communicate with a user equipment (UE) during the at least two subslots within the subframe.

In another aspect of the disclosure, a second method, a second computer-readable medium, and a second apparatus are provided. The second apparatus may receive ACK/NACK information associated with a second type of data or control information. The second apparatus may reduce a transmission power for a first type of data or control information during a subsequent subframe when the ACK/NACK information indicates a negative acknowledgement.

In another aspect of the disclosure, a third method, a third computer-readable medium, and a third apparatus are provided. The third apparatus may receive a second type of data or control information carried in at least two subslots bundled within a subframe, and the second type of data or control information may be punctured into a first type of data or control information. The subframe may include a portion for carrying ACK/NACK information associated with the second type of data or control information. The third apparatus may determine ACK/NACK information for the second type of data or control information carried in the bundled at least two subslots. The third apparatus may send the ACK/NACK information during the portion of the subframe for carrying ACK/NACK information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 17 is a diagram illustrating an example of a hardware implementation for an apparatus employing a processing system.

DETAILED DESCRIPTION

Figure 1:
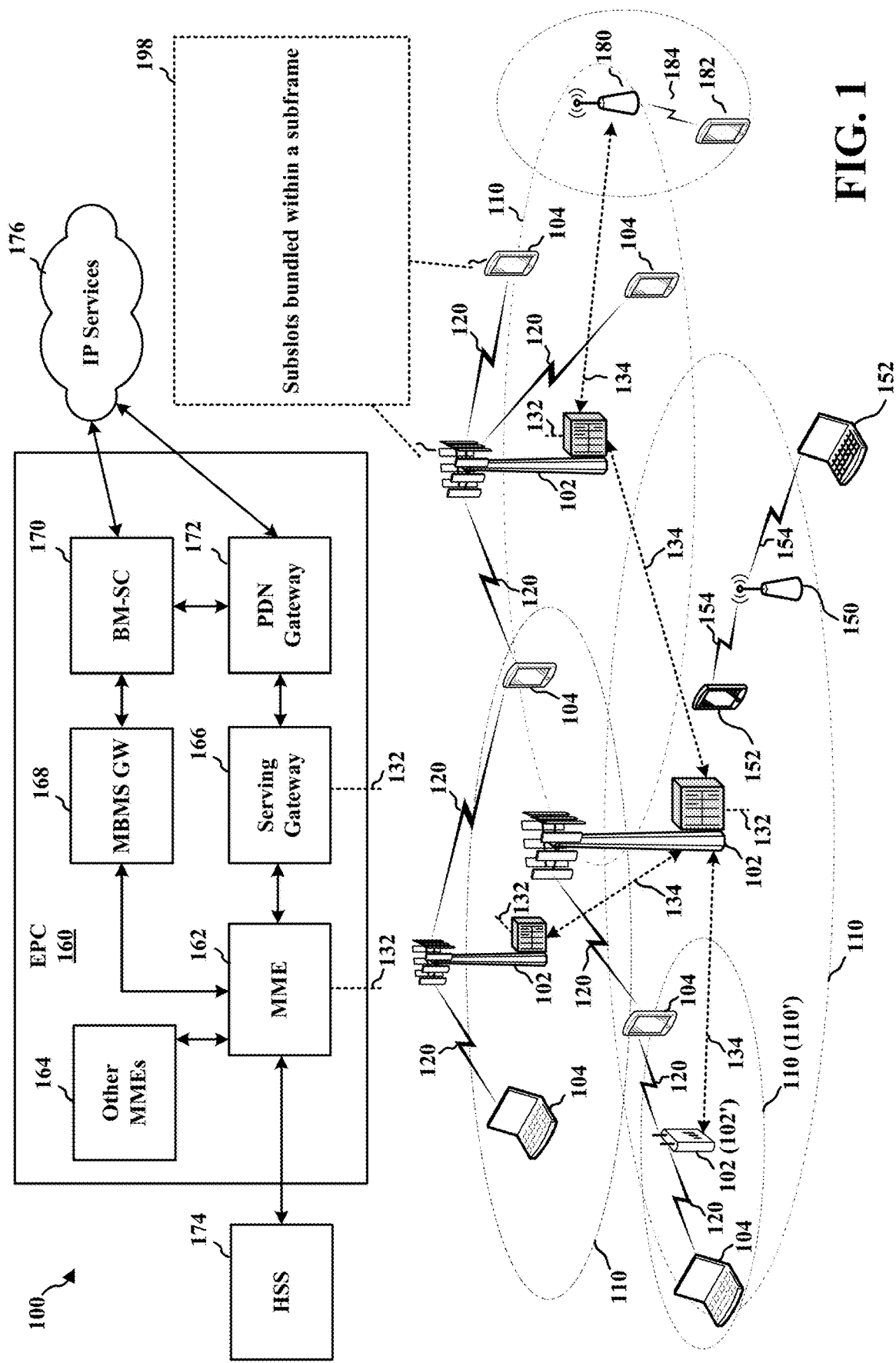
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The wireless communications system and an access network 100 may include a base station 180, which may be a millimeter wave (mmW) base station. In one aspect, the mmW base station 180 may be integrated with another base station, such as a cellular base station, eNB, and the like. The mmW base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the first base station 102 may neighbor the second base station 180. Consequently, the second base station 180 may cause interference to communication between the UE 104 and the first base station 102. For example, the second base station 180 may cause interference to acknowledgement (ACK)/negative acknowledgement (NACK) information communicated by the UE 104 to the first base station 102 in response to downlink transmissions from the first base station 102. Therefore, the communication between the first base station 102 and the UE 104 may benefit from one or more operations that mitigate interference.

In various aspects, the first base station 102 may configure a subframe with a subslot configuration that includes a plurality of subslots, and each subslot may have a number of symbols (e.g., a duration) that is less than a number of symbols included in each subframe. Each subframe may include a portion for carrying ACK/NACK information. In aspects, the first base station 102 may puncture, in at least two subslots included in a subframe, a first type of data or control information with a second type of data or control information. For example, the first base station 102 may puncture, in at least two subslots included in a subframe, data or control information associated with enhanced mobile broadband (eMBB) with data or control information associated with ultra-reliable low-latency communication (URLLC). In aspects, the first base station 102 may bundle the at least two subslots within a subframe, and the ACK/NACK portion of the subframe may be used to carry ACK/NACK information associated with the second type of data or control information carried in the bundled at least two subslots 198. In an aspect, the first base station 102 may communicate the second type of data or control information with the UE 104 during the bundled at least two subslots 198.

In aspects, the UE 104 may receive the second type of data or control information during the bundled subslots 198. The UE 104 may determine ACK/NACK information for the second type of data or control information carried in the bundled at least two subslots 198. For example, the UE 104 may determine an ACK when the UE 104 is able to successfully decode the second type of data or control information carried in the bundled subslots 198. However, the UE 104 may determine a NACK when the UE 104 is unable to successfully decode the second type of data or control information carried in the bundled subslots 198. The UE 104 may then send the ACK/NACK information during the portion of the subframe for carrying ACK/NACK information. In an aspect, the UE 104 may send the ACK/NACK information on an uplink common burst (UCB) channel, which may also be known in some aspects as an eMBB UCB channel.

When the first base station 102 receives a NACK associated with the second type of data or control information carried in the bundled at least two subslots 198, the first base station 102 may determine that the second type of data or control information is to be retransmitted to the UE 104, for example, because the UE 104 was unable to decode the second type of data or control information carried in the bundled subslots 198. Accordingly, the first base station 102 may reschedule the second type of data or control information and send the rescheduled second type of data or control information to the UE 104.

While the ACK/NACK information sent by the UE 104 may be intended for the first base station 102, the second base station 180 may also receive the ACK/NACK information from the UE 104, for example, due to the proximity of the second base station 180 to the first base station 102 and/or the UE 104. Based on the reception of the ACK/NACK information, the second base station 180 may be configured to reduce a transmission power for a first type of data or control information (e.g., eMBB data or control information) during a subsequent subframe. For example, the ACK/NACK information may indicate a negative acknowledgement, and therefore the second base station 180 may reduce a transmission power during a subsequent subframe (e.g., when the first base station 102 transmits the rescheduled second type of data or control information), for example, in order to mitigate interference that the second base station 180 may otherwise introduce when the second type of data or control information is retransmitted by the first base station 102 to the UE 104. In one aspect, the second base station 180 may reduce transmission power by yielding transmission of the first type of data or control information (e.g., the second base station 180 may delay transmission of the first type of data or control information until the first base station 180 retransmits the second type of data or control information).

In order for the second base station 180 to detect the ACK/NACK information from the UE 104, the first base station 102 may send, to the second base station 102, information associated with the ACK/NACK configuration. The first base station 102 may send the information indicating the configuration using a backhaul link 134 (e.g., via the X2 interface).

Accordingly, the first base station 102 may send, to the second base station 180, information indicating a configuration of the portion for carrying the ACK/NACK information associated with the second type of data or control information. The information indicating the configuration may include, for example, an indication of one or more resources on which the ACK/NACK information may be carried. For example, the first base station 102 may indicate, to the second base station 180, information indicating one or more symbols during which the ACK/NACK information may be carried (e.g., the last symbol of a subframe). In one aspect, the first base station 102 may indicate, to the second base station 180, a channel on which the ACK/NACK information is to be carried, such as an UCB channel.

Figure 2:
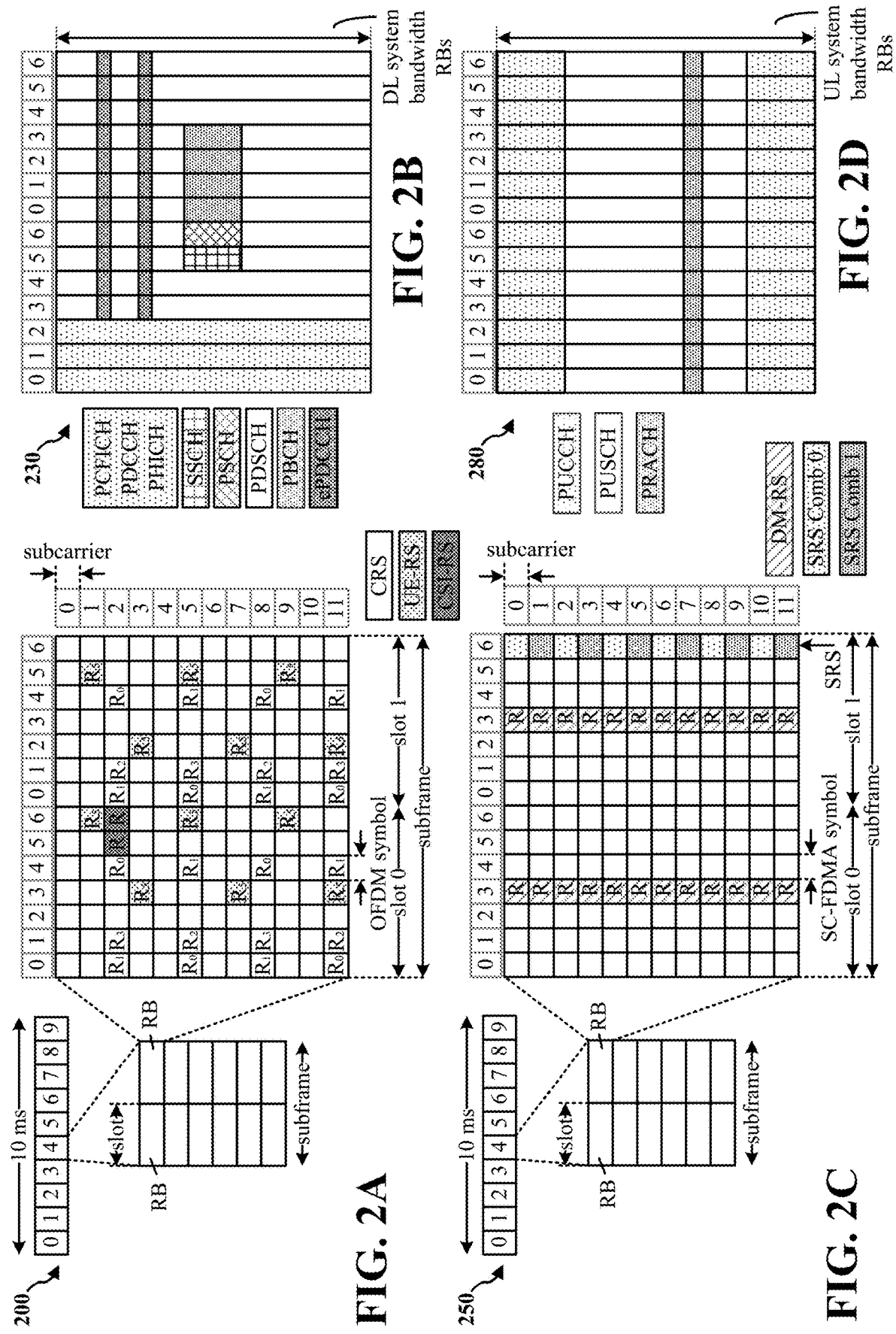
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
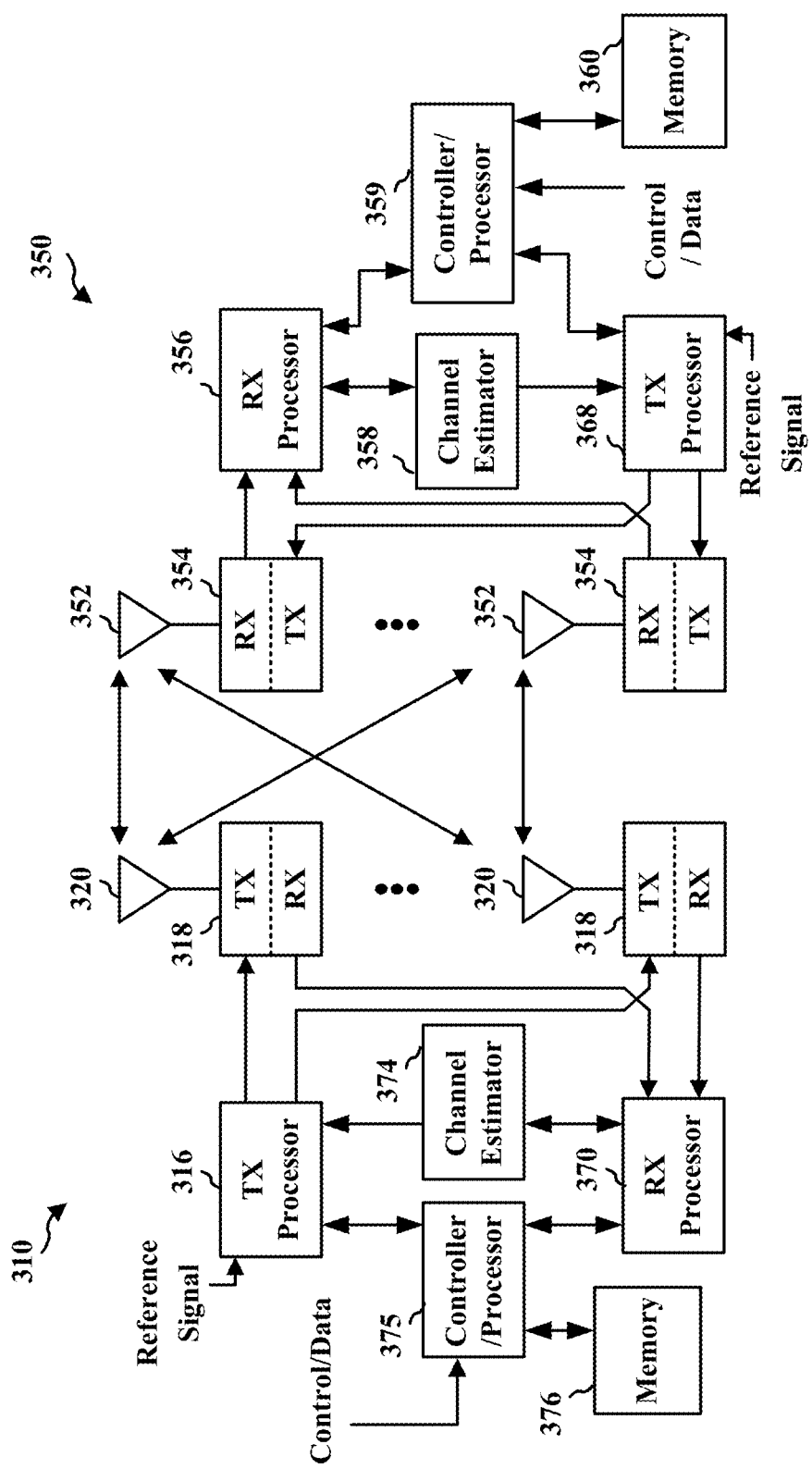
FIG. 3 is a diagram illustrating an example of a base station and user equipment (UE) in an access network.

FIG. 3 is a block diagram of a base station 310 in communication with a UE 350 in an access network. In one aspect, the base station 310 may be a base station providing a macro cell, such as an eNB. In another aspect, the base station 310 may be a mmW base station. In yet another aspect, the base station 310 may include a mmW base station that is integrated with another base station, such as a base station providing a macro cell. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
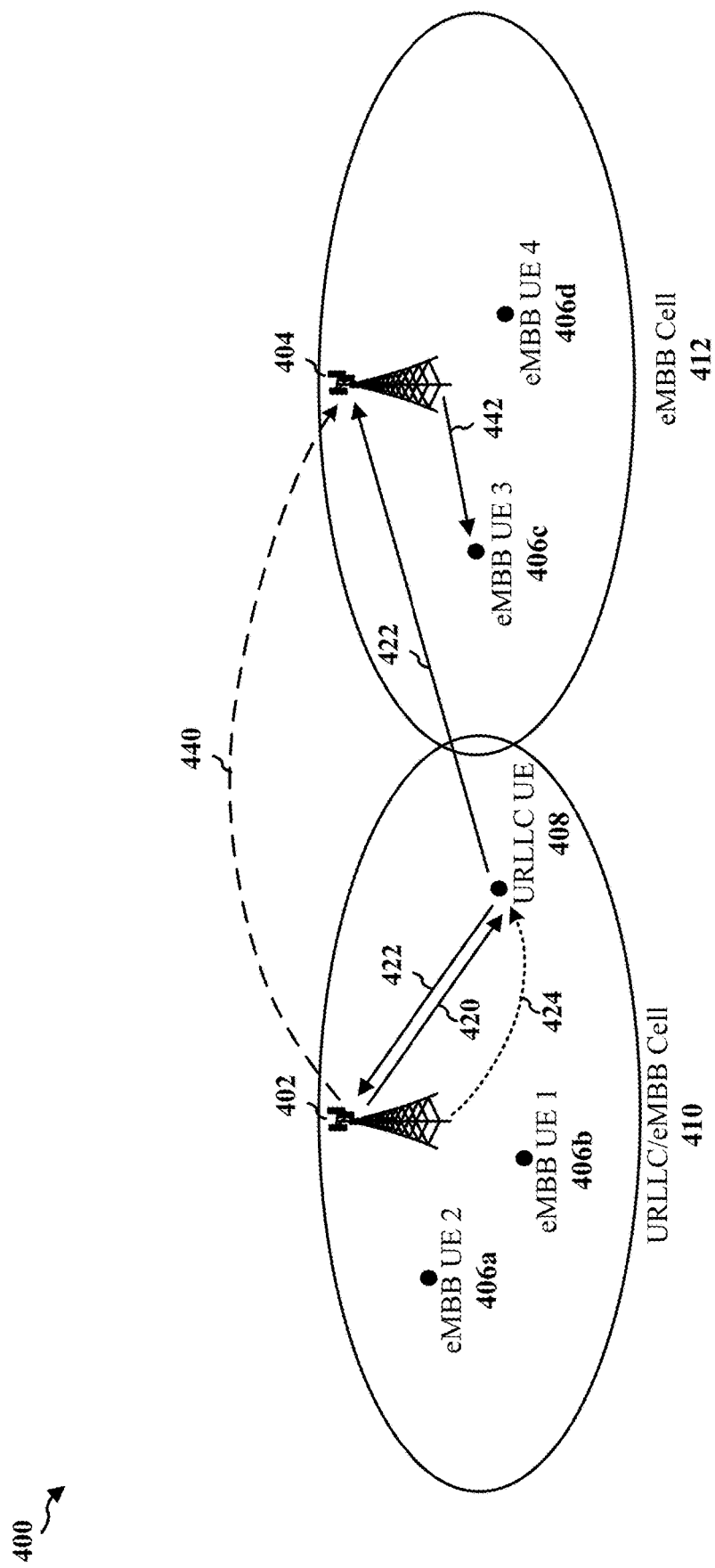
FIG. 4 is a diagram of a wireless communications system.

FIG. 4 is a diagram of a wireless communications system 400. The wireless communications system 400 may include a plurality of base stations 402, 404, each configured to provide a respective cell 410, 412. Each of the base stations 402, 404 may be configured to communicate with one or more UEs 406a, 406b, 406c, 406d, 408 operating on the respective cells 410, 412.

In one aspect, the first base station 402 may be configured to communicate at least two types of traffic: a first type of traffic which may eMBB traffic and a second type of traffic which may be URLLC traffic. In the illustrated aspect, the first base station 402 may communicate with a first UE 408 according to URLLC and, additionally, may communicate with a second UE 406a according to eMBB. The second base station 404 may be configured to communicate with the third and fourth UEs 406c, 406d according to at least eMBB. According to one or more 3GPP technical specifications, both URLLC and eMBB may be regarded as 5G technologies; that is, the 5G RAT may include URLLC technologies and eMBB technologies.

In one aspect, the subframe structure used for both the first type of traffic (e.g., eMBB) and the second type of traffic (e.g., URLLC) may be synchronized. For example, subframe boundaries for the first type of traffic (e.g., eMBB) and the second type of traffic (e.g., URLLC) may be synchronized, and the first type of traffic and the second type of traffic may have the same numerology (e.g., a reference numerology, which may be fourteen). Further, the subframe structure for both the first type of traffic and the second type of traffic may be the same, including a first portion for data or control information (e.g., twelve symbols), a second portion being a gap (e.g., a one-symbol gap), and a third portion for carrying ACK/NACK information at the end of the subframe structure (e.g., a one-symbol portion for carrying the UCB channel). The second portion may occur between the first portion and third portion in the synchronized subframe structure.

In an aspect, the base stations 402, 404 may be configured to use a new radio (NR) frame structure at least within a cyclic prefix (CP) overhead. The description of NR frame structure is to be regarded as illustrative, and the present disclosure comprehends other structures or arrangements in addition to those described herein.

In one aspect, the reference numerology for a subframe definition may be fourteen (14). That is, the base stations 402, 404 may be configured to communicate during a subframe that includes fourteen symbols.

In an aspect, the NR frame structure may include slots of a duration that is less than the reference numerology for a subframe (e.g., a number of symbols per slot may be fewer than a number of symbols per subframe). In an aspect, an integer number of slots may fit within one subframe duration (e.g., at least for subcarrier spacing that is larger than or equal to the reference numerology). In an aspect, such a slot structure may allow for control information at the beginning, end, or both the beginning and end of a slot. The slot configuration may be one possible scheduling unit observed by the one or more base stations 402, 404.

In an aspect, the NR frame structure may include a subslot configuration, which may also be known as a "mini-slot" or another naming convention related to a transmission time interval (TTI). The subslot configuration may support a transmission time or interval that is shorter than the reference numerology (as well as the slot numerology). For example, the reference numerology for a subframe may be fourteen, and the numerology for a subslot may be less than fourteen (and may be less than the slot numerology, as well). In one aspect, a subslot may be the smallest scheduling unit observed by one or more base stations 402, 404. In one aspect, the subslot configuration may indicate that control information may occur at the beginning of a subslot, the end of a subslot, or both the beginning and the end of a subslot. In one aspect, the slot structure and subslot structure may be merged. In another aspect, the slot configuration may be absent.

As indicated, the first base station 402 may communicate a second type of data and/or control information associated with URLLC. In one aspect, URLLC data and/or control information may be predictable (e.g., periodic), in which case at least one semi-static resource may be reserved for frequency-division multiplexing (FDM) or time-division multiplexing (TDM) of URLLC content with eMBB information. In one aspect, URLLC data and/or control information may be less predictable (e.g., sporadic), in which case the first base station 402 may be configured to puncture eMBB information with URLLC data and/or control information. URLLC technologies may require packet delivery to occur with stringent latency constraints and/or relatively low packet error rate. Therefore, interference from other RATs due to coexistence may have detrimental consequences to the performance of URLLC. URLLC data and/or control information may be prioritized over eMBB data and/or control information and, therefore, the first base station 402 may perform one or more operations in order to mitigate inter-cell interference (e.g., interference caused by traffic in neighboring cells) and improve quality of URLLC applications.

The first base station 402 may be a neighbor of the second base station 404. For example, the second base station 404 may be adjacent to the first base station 402. Consequently, the second base station 404 may cause interference to communication between the first UE 408 and the first base station 402. For example, the second base station 404 may cause interference to ACK/NACK information communicated by the first UE 408 to the first base station 402 in response to downlink transmissions from the first base station 402. Therefore, the communication between the first base station 402 and the first UE 408 may benefit from one or more operations by the second base station 404 that mitigate the interference.

In various aspects, the first base station 402 may configure a subframe with a subslot configuration that includes a plurality of subslots. Each subslot may have a number of symbols (e.g., a duration) that is less than a number of symbols included in each subframe. Each subframe may include a portion for carrying ACK/NACK information. In aspects, the first base station 402 may puncture, in at least two subslots included in a subframe, a first type of data or control information (e.g., eMBB data or control information) with a second type of data or control information (e.g., URLLC data or control information). For example, the first base station 402 may puncture data or control information associated with eMBB carried in at least two subslots included in a subframe, with data or control information associated with URLLC. In aspects, the first base station 402 may bundle the at least two subslots within a subframe, and the ACK/NACK portion of the subframe may be used to carry ACK/NACK information associated with the second type of data or control information carried in the bundled at least two subslots. In an aspect, the first base station 402 may communicate the second type of data or control information 420 with the first UE 408 during the bundled subslots 198.

In aspects, the first UE 408 may receive the second type of data or control information 420 during the at least two bundled subslots. The first UE 408 may determine ACK/NACK information for the second type of data or control information 420 carried in the bundled subslots. For example, the first UE 408 may bundle ACK/NACK information 422 for the bundled subslots (e.g., the ACK/NACK information 422 may indicate an acknowledgement or negative acknowledgment for the second type of data or control information 420 even through the second type of data or control information may be carried in a plurality of subslots).

In one aspect, the first UE 408 may determine an ACK when the first UE 408 is able to successfully decode the second type of data or control information 420 carried in the bundled subslots. However, the first UE 408 may determine a NACK when the first UE 408 is unable to successfully decode the second type of data or control information 420 carried in the bundled subslots. The first UE 408 may then send the ACK/NACK information 422 during the portion of the subframe allocated for carrying ACK/NACK information.

When the first base station 402 receives ACK/NACK information 422 indicating a NACK associated with the second type of data or control information 420 carried in the bundled subslots, the first base station 402 may determine that the second type of data or control information 420 is to be retransmitted to the first UE 408, for example, because the first UE 408 was unable to decode the second type of data or control information 420 carried in the bundled subslots. Accordingly, the first base station 402 may reschedule the second type of data or control information 420 and send the rescheduled second type of data or control information 424 to the first UE 408, for example, in another subslot of a subsequent frame. While the second type of data or control information 420 may be carried in bundled subslots, the first base station 402 may send the rescheduled second type of data or control information 424 in one subslot (e.g., the rescheduled second type of data or control information 424 may be communicated using fewer symbols to carry the bits for the rescheduled second type of data or control information 424).

While the ACK/NACK information 422 sent by the first UE 408 may be intended for the first base station 402, the second base station 404 may also receive the ACK/NACK information 422 from the first UE 408, for example, due to the proximity of the second base station 404 to the first base station 402 and/or the first UE 408. In an aspect, the first UE 408 may send the ACK/NACK information 422 on an UCB channel, which may also be known in some aspects as an eMBB UCB channel. Thus, while the second base station 404 may be configured to communicate according to the first type of data or control information (e.g., eMBB), the ACK/NACK information 422 associated with the second type of data or control information (e.g., URLLC) may be carried on a channel that the second base station 404 is configured to monitor.

Based on the reception of the ACK/NACK information 422, the second base station 404 may be configured to reduce a transmission power for a first type of data or control information 442 (e.g., eMBB data or control information) during a subsequent subframe (e.g., the next subframe immediately following the subframe including the bundled subslots in which the second type of data or control information 420 is transmitted). For example, the ACK/NACK information 422 may indicate a NACK, and therefore the second base station 404 may reduce a transmission power (e.g., perform power fallback) during a subsequent subframe in which the second base station 404 transmits the first type of data or control information 442. According to one aspect, the second base station 404 may reduce a transmission power by selecting a second transmission power that is lower than a previously used transmission power. In another aspect, the second base station 404 may reduce a transmission power by reducing a previously used transmission power by a predetermined increment or percentage.

In one aspect, the first base station 402 may transmit the rescheduled second type of data or control information 424 contemporaneously with the transmission of the first type of data or control information 442 by the second base station 404. Therefore, the second base station 404 may reduce a transmission power (e.g., perform power fallback) during the contemporaneous transmission of the first type of data or control information 442, which may mitigate interference to transmission of the rescheduled second type of data or control information 424 by the first base station 402.

In another aspect, the second base station 404 may reduce transmission power by yielding transmission of the first type of data or control information 442 (e.g., the second base station 404 may delay transmission of the first type of data or control information 442 until after the first base station 402 transmits the rescheduled second type of data or control information 424). For example, the second base station 404 may yield transmission during a subframe immediately following the subframe in which the ACK/NACK information 422 is carried. The second base station 404 may then transmit the first type of data or control information 442 during a subframe that follows the subframe during which the second base station 404 yielded transmission.

In order for the second base station 404 to detect the ACK/NACK information from the first UE 408, the first base station 402 may send, to the second base station 404, information 440 associated with the ACK/NACK configuration. The first base station 402 may send the information 440 indicating the configuration using a backhaul link (e.g., via the X2 interface).

Accordingly, the first base station 402 may send, to the second base station 404, information 440 indicating a configuration of the portion for carrying the ACK/NACK information 422 associated with the second type of data or control information. The second base station 404 may receive this information 440 and, therefore, determine one or more resources that the second base station 404 is to monitor in order to detect ACK/NACK information 422.

The information 440 indicating the configuration may include, for example, an indication of one or more resources on which the ACK/NACK information 422 may be carried. For example, the first base station 402 may indicate, to the second base station 404, information 440 indicating one or more symbols during which the ACK/NACK information 422 may be carried (e.g., the last symbol of a subframe). In one aspect, the first base station 402 may send, to the second base station 404, information 440 indicating a channel on which the ACK/NACK information is to be carried, such as an UCB channel.

In one aspect, the first base station 402 may transmit the rescheduled second type of data or control information 424 during a subslot that does not consume an entire subframe. Therefore, the second base station 404 may yield or perform power fallback during a portion of a subframe. The first base station 402 may then transmit the rescheduled second type of data or control information 424 during the portion of the subframe in which the second base station reduces transmission power (e.g., the subslot carrying the rescheduled second type of data or control information 424 may occur contemporaneously with the portion of the subframe during which the second base station 404 reduces transmission power).

Figure 5:
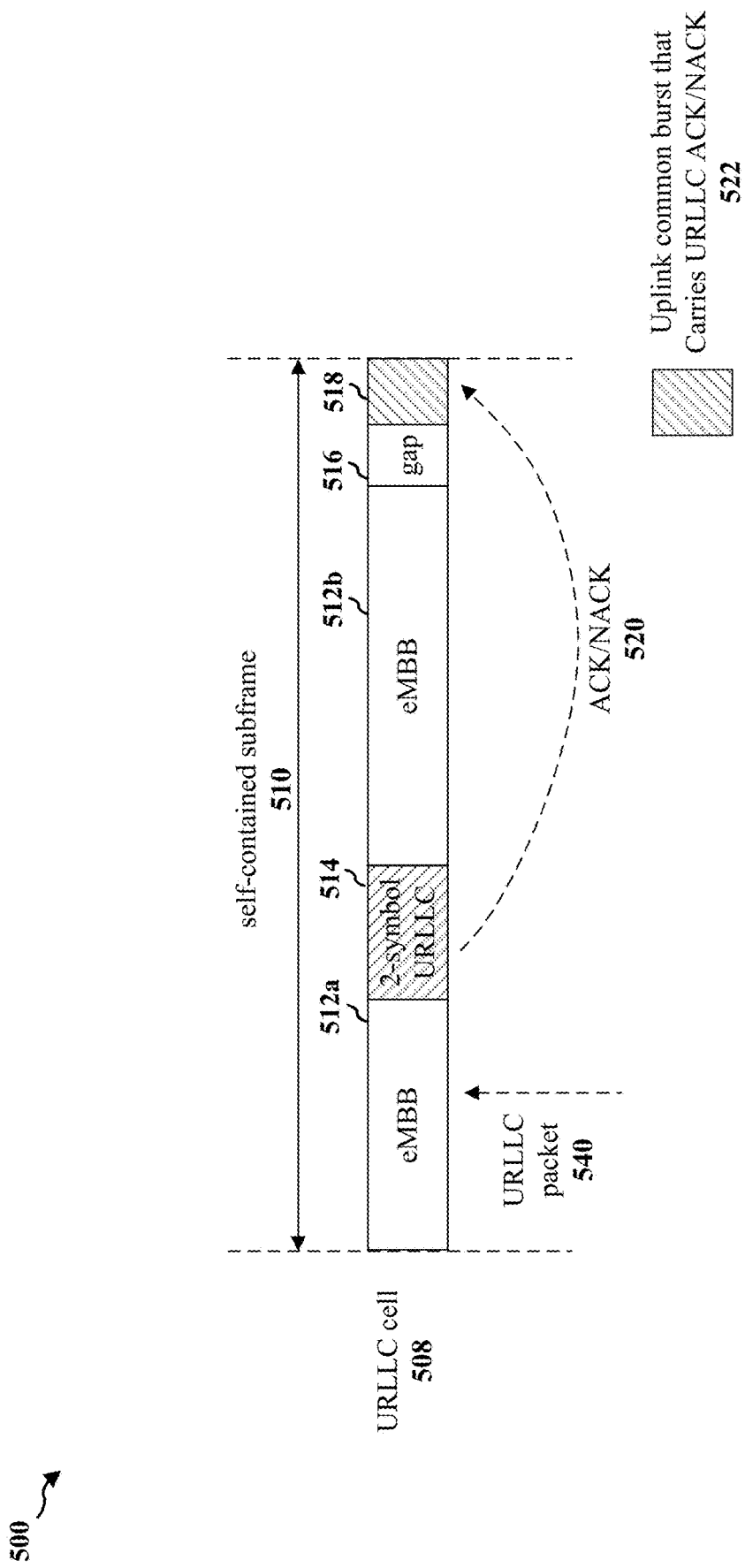
FIG. 5 is a diagram of a subframe structure.

FIG. 5 illustrates a subframe structure 500, according to an aspect. The subframe structure 500 may include a self-contained subframe 510. That is, the self-contained subframe 510 may include a portion 518 for carrying ACK/NACK information. In an aspect, the ACK/NACK information may be carried on an UCB channel 522.

In aspects, a base station may communicate content in a URLLC cell 508 during the self-contained subframe 510. When a URLLC packet 540 arrives (e.g., from a higher layer), the base station may puncture data or control information associated with eMBB with URLLC data or control information derived from the URLLC packet 540. For example, the URLLC data or control information from the URLLC packet 540 may be carried in two symbols of a URLLC portion 514 of the self-contained subframe 510. The corresponding ACK/NACK information 520 for the URLLC content carried in the URLLC portion 514 may occur during the ACK/NACK portion 518 at the end of the self-contained subframe 510.

Because URLLC may adhere to low-latency and low-error rate requirements, the URLLC content may be punctured into the self-contained subframe 510 as soon as the URLLC packet 540 arrives. Therefore, a first eMBB portion 512a may carry eMBB data or control information, and the URLLC portion 514 may be punctured following the first eMBB portion 512a (e.g., according to when the URLLC packet 540 arrives). Because the URLLC data or control information may be punctured into the eMBB data or control information, an intervening eMBB portion 512b may occur between the URLLC portion 514 and the ACK/NACK portion 518. In various aspects, a gap 516 may additionally occur before the ACK/NACK information 520 (e.g., for switching between uplink and downlink). This intervening eMBB portion 512b and/or gap 516 may lead to a delay in communicating ACK/NACK information 520, for example, because of the intervening eMBB portion 512b. Accordingly, a URLLC cell may benefit from a bundled subslot configuration.

Figure 6:
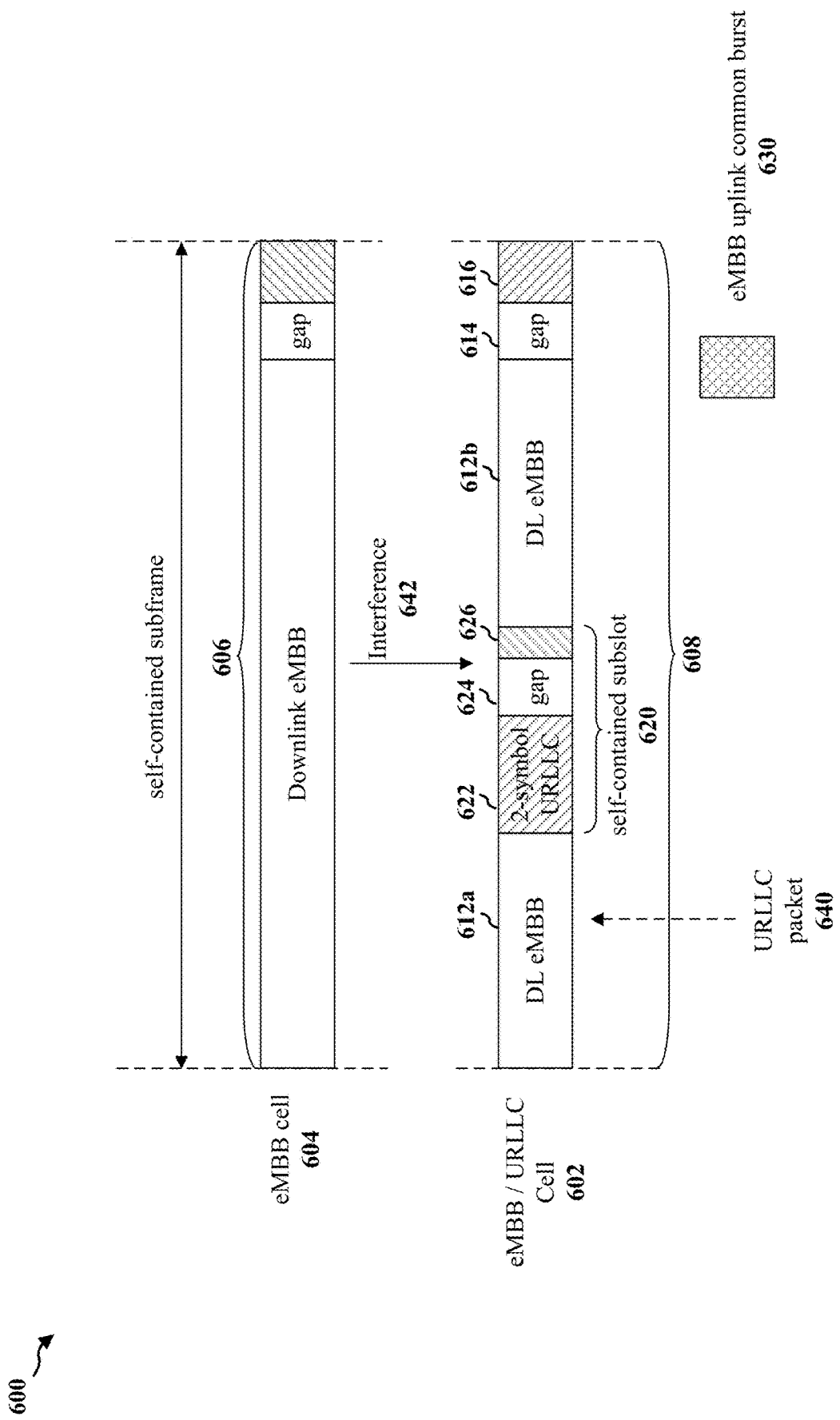
FIG. 6 is a diagram of a subslot configuration.

FIG. 6 illustrates a subslot configuration 600, according to an aspect. In an aspect, an eMBB/URLLC cell 602 (e.g., the first cell 410 provided by the first base station 402) may configure a subframe 608 with a self-contained subslot 620. The subslot 620 may be regarded as "self-contained" because the subslot 620 includes at least a first portion 622 for carrying data or control information and a third portion 626 for carrying ACK/NACK information associated with the first portion 622 (n.b., the subslot 620 may include a second portion 624 that is a gap between the first and third portions). That is, the self-contained subslot 620 may include a portion 626 for carrying ACK/NACK information. The subframe 608 configured with the self-contained subslot 620 may include a separate portion 616 for carrying a UCB channel, for example, after a gap 614 (e.g., for switching between downlink and uplink).

In aspects, a base station may communicate content in a eMBB/URLLC cell 602 during the subframe 608. When a URLLC packet 640 arrives (e.g., from a higher layer), the base station may puncture data or control information associated with eMBB with URLLC data or control information derived from the URLLC packet 640. For example, the URLLC data or control information from the URLLC packet 640 may be carried in two symbols of a self-contained subslot 620. Because URLLC may adhere to low-latency and low-error rate requirements, the URLLC content may be punctured into the self-contained subslot 620 as soon as the URLLC packet 640 arrives. For example, for the subframe 608, a first eMBB portion 612a may be mapped to the subframe, and data or control information from the URLLC packet may be punctured in the subframe after the first eMBB portion 612a, but before a second eMBB portion 612b. Also after the first eMBB portion 612a but before the second eMBB portion 612b may be a second portion 624 (e.g., gap for switching between downlink and uplink) and the portion 626 carrying the ACK/NACK information related to the first portion 622, thus forming the self-contained subslot 620.

In an eMBB cell 604, which may neighbor the eMBB/URLLC cell 602, data or control information associated with eMBB may be communicated during a subframe 606 that overlaps with (e.g., occurs contemporaneously with) the self-contained subslot 620. This eMBB traffic during the eMBB subframe 606 may cause interference 642 to the self-contained subslot 620. For example, the interference 642 may prevent a base station from receiving and/or decoding ACK/NACK information associated with the first portion 622 of the self-contained subslot 620. Accordingly, the URLLC (or URLCC/eMBB) cell may benefit when the subslot configuration of the URLLC cell is bundled and ACK/NACK information is carried on the UCB channel 630. For example, ACK/NACK information in a URLLC cell but carried on the UCB channel 630 may be received in the eMBB cell 604 and transmission power may be reduced in the eMBB cell to mitigate interference 642 during transmission of a subsequent subframe.

Figure 7:
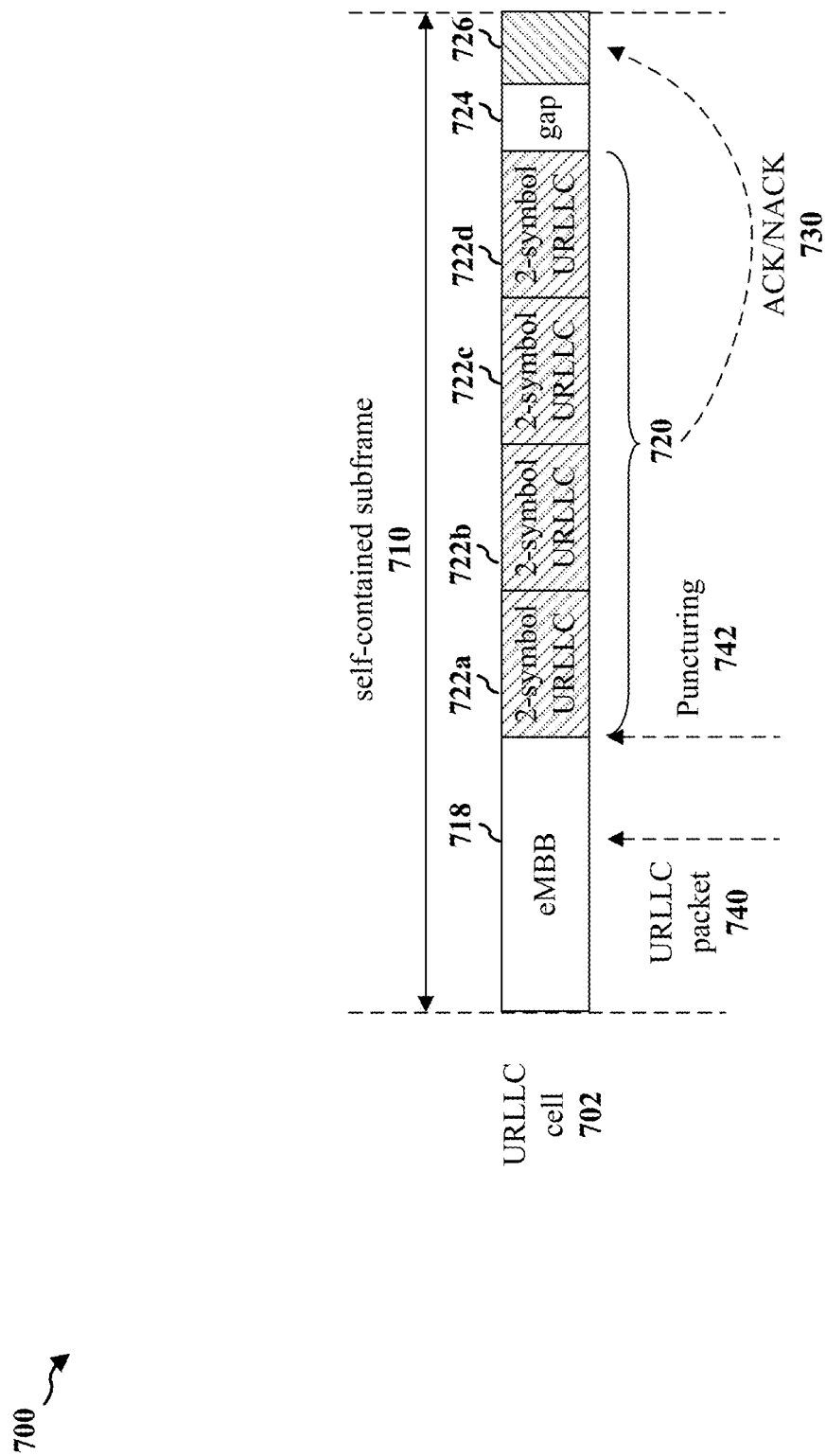
FIG. 7 is a diagram of a subslot configuration.

FIG. 7 illustrates a subslot configuration 700, according to an aspect. While FIG. 7 illustrates the configuration 700 in the context of eMBB as a first type of traffic and URLLC as a second type of traffic, the present disclosure comprehends different types of traffic, such as machine-type communication (MTC), enhanced MTC, or another 5G technology.

In various aspects, a subframe 710 may be configured in cell (e.g., the first cell 410, the eMBB/URLLC cell 602) based on a reference numerology, such as fourteen. The subframe 710 may include a portion 718 that is to carry data and/or control information and a portion 726 that is to carry ACK/NACK information (e.g., on a UCB channel), with a gap 724 occurring between the portion 718 in which data and/or control information is carried and the portion 726 in which ACK/NACK information is carried.

In various aspects, URLLC may require expeditious delivery. Therefore, when a URLLC packet arrives (e.g., from a higher layer), the URLLC information should be communicated as quickly as possible. In FIG. 7, a URLLC packet 740 may arrive (e.g., from a higher layer) and may be scheduled in a same subframe 710 during which the URLLC packet 740 arrives.

In an aspect, data and/or control information determined from the URLLC packet 740 may be punctured 742 by a base station into symbols of the portion 718 (e.g., carrying eMBB data or control information) in order to quickly schedule URLLC data or control information. The URLLC data or control information may then be carried in the subslots 722a, 722b, 722c, 722d, which may be included in a bundle 720 during the subframe 710). In one aspect, the bundle 720 may occupy a remainder of the subframe after puncturing 742 begins (e.g., an intervening eMBB portion 612b may be absent). In other words, after puncturing 742, the bundle 720 may occupy a remainder of the subframe until the gap 724. The bundle 720 may improve reliability of communicating the data or control information determined from the URLLC packet 740 within a hard latency bound.

For example, in the context of FIG. 4, the second type of data or control information 420 may be determined from the URLLC packet 740. The first base station 402 may include, in a bundle 720, a plurality of subslots 722a, 722b, 722c, 722d in which the second type of data or control information 420 is to be carried. In one aspect, the subframe 710 may carry eMBB data or control information and, therefore, the first base station 402 may puncture 742 the eMBB data or control information with the second type of data or control information 420 obtained from the URLLC packet 740. The base station 402 may then communicate the second type of data or control information 420 to the first UE 408 during the subslots 722a, 722b, 722c, 722d included in the bundle 720 within the subframe 710.

Further to such an example, the first UE 408 may receive the second type of data or control information 420 during the subslots 722a, 722b, 722c, 722d included in the bundle 720 within the subframe 710. The first UE 408 may determine ACK/NACK information 730 (e.g., ACK/NACK information 422) for the second type of data or control information 420. The first UE 408 may then send the ACK/NACK information 730 (e.g., ACK/NACK information 422) during the portion 726 of the subframe 710 for carrying ACK/NACK information. In an aspect, the ACK/NACK information 730 (e.g., ACK/NACK information 422) may be carried on an UCB channel.

While the subslot configuration 700 illustrates a plurality of subslots 722a, 722b, 722c, 722d each having two OFDM symbols, other configurations are possible without departing from the present disclosure. For example, a first subslot 722a may include two symbols, whereas a second subslot 722b may include four symbols. In one aspect, a bundle 720 of subslots 722a, 722b, 722c, 722d that contains N total symbols (e.g., two, four, eight, etc.) may be equivalently replaced by an N-symbol subslot. For example, a bundle 720 of four two-symbol subslots 722a, 722b, 722c, 722d may be equivalent to a single eight-symbol subslot.

Figure 8:
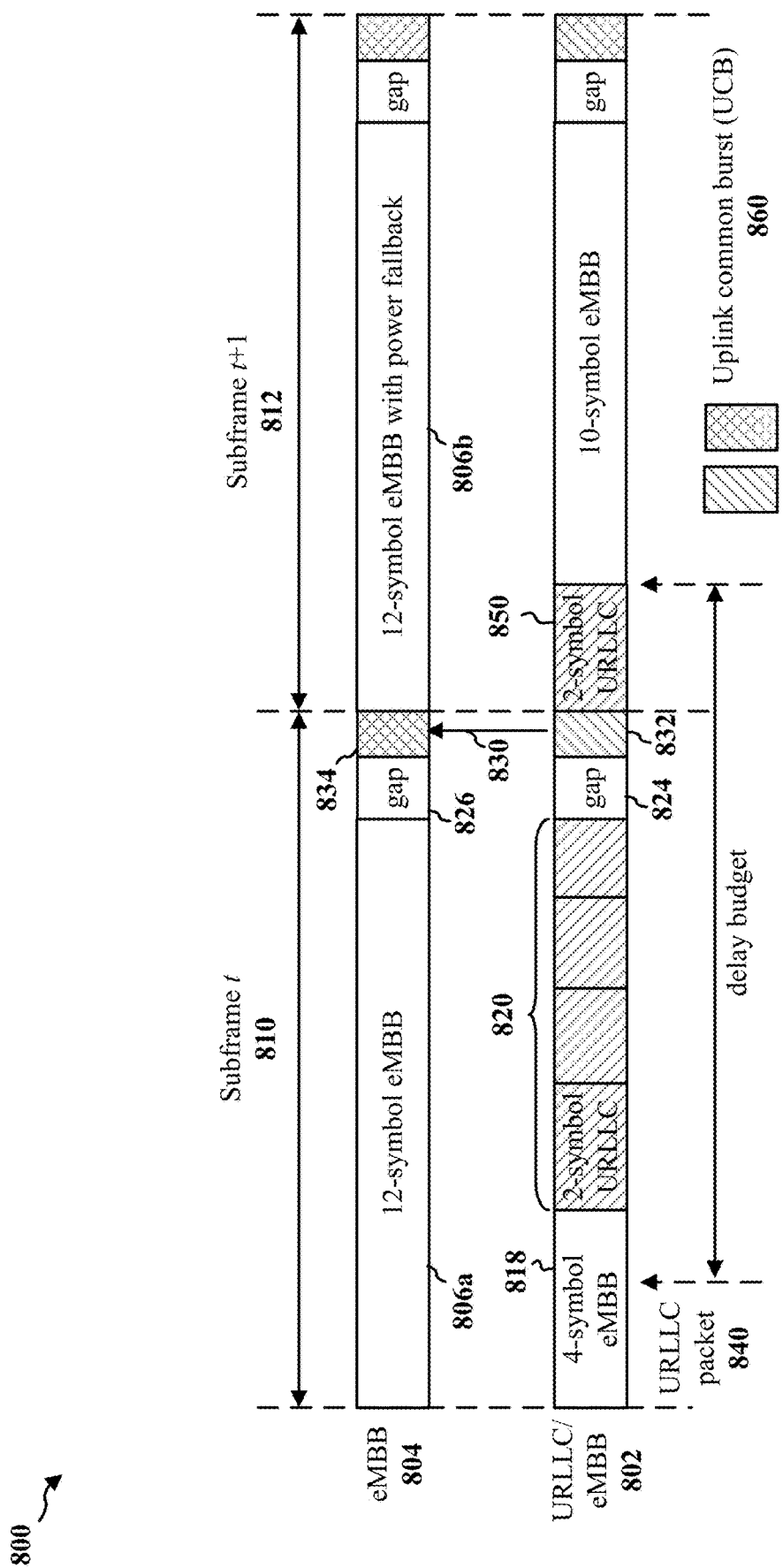
FIG. 8 is a diagram of a subslot configuration.

FIG. 8 is a diagram of a subslot configuration 800, according to various aspects. While FIG. 8 illustrates the configuration 800 in the context of eMBB as a first type of traffic and URLLC as a second type of traffic, the present disclosure comprehends different types of traffic, such as MTC, enhanced MTC, or another 5G technology.

In one aspect, a subframe structure used for a first cell (e.g., a URLLC/eMBB cell 802) and a second cell (e.g., the eMBB cell 804) may be synchronized. For example, subframe boundaries for the first type of traffic (e.g., eMBB) and the second type of traffic (e.g., URLLC) may be synchronized, and the first type of traffic and the second type of traffic may have the same numerology (e.g., a reference numerology, which may be fourteen). In one aspect, a first base station (e.g., providing the URLLC/eMBB cell 802) may provide information on subframe timing (e.g., boundaries) to another base station (e.g., providing the eMBB cell 804) so that the other base station may synchronize subframe boundaries with the first base station. For example, the first base station may send information on subframe timing (e.g., boundaries) over an X2 interface.

The subframe structure for the URLLC/eMBB cell 802 may include a first portion 818 (e.g., twelve symbols) for carrying data or control information, and a third portion 832 (e.g., one symbol) for carrying ACK/NACK information, and a gap 824 (e.g., one symbol) may occur between the first portion 818 and the third portion 832. Similarly, the subframe structure for the eMBB cell 804 may include a first portion 806a (e.g., twelve symbols) for carrying data or control information and a third portion 834 (e.g., one symbol) for carrying ACK/NACK information, and a gap 826 (e.g., one symbol) may occur between the first portion 806a and the third portion 834.

In various aspects, the respective first portions 818, 806a may be configured in a respective cell 802, 804 based on a reference numerology, such as fourteen. Based on the synchronization, the first portion 818 in the URLLC/eMBB cell 802 may occur contemporaneously with the first portion 806a in the eMBB cell 804 during the subframe t 810. For example, each of the first portions 818, 806a may be twelve symbols. Similarly, the third portion 832 in the URLLC/eMBB cell 802 may occur contemporaneously with the third portion 834 in the eMBB cell 804 during the subframe t 810, with respective gaps 824, 826 occurring between respective first portions 818, 806a and third portions 832, 834.

In various aspects, URLLC applications may require expeditious delivery. Therefore, when a URLLC packet arrives (e.g., from a higher layer), the URLLC information should be communicated as quickly as possible. In FIG. 8, a URLLC packet 840 may arrive (e.g., from a higher layer) and may be scheduled in a same subframe t 810 during which the URLLC packet 840 arrives.

In an aspect, data and/or control information determined from the URLLC packet 840 may be punctured into symbols of the first portion 818 in the URLLC/eMBB cell 802 in order to quickly schedule URLLC data or control information. The URLLC data or control information may then be carried in bundled subslots 820 during the subframe t 810. In one aspect, the bundle 820 may occupy a remainder of the subframe after puncturing begins (e.g., after puncturing the bundled subslots 820 may occupy the subframe t 810 until the gap 824).

In various aspects, a first base station (e.g., the first base station 402) may be punctured into symbols of the first portion 818 during the bundled subslots 810, for example, after a four-symbol eMBB portion (e.g., the bundled subslots 820 may occupy the remaining eight symbols of the first portion 818). URLLC data or control information, determined from the URLLC packet 840, may then be communicated to a UE (e.g., the first UE 408) during the bundled subslots 820 of the subframe t 810.

The UE may receive the URLLC data or control information carried in the bundled subslots 820 and attempt to decode the URLLC data or control information. In an aspect, the UE may be unable to successfully decode the URLLC data or control information carried in the bundled subslots 820 and, therefore, may determine a NACK 830 in order to indicate that the UE is unable to decode the URLLC data or control information carried in the bundled subslots 820. The UE may then send the NACK 830 during the third portion 832, and the NACK may be carried on a UCB channel 860.

The NACK 830 may be received in both the URLLC/eMBB cell 802 and the eMBB cell 804. In the URLLC/eMBB cell 802, a first base station (e.g., the first base station 402) may determine, based on the NACK 830, that the URLLC data or control information carried in the bundled subslots 820 is to be rescheduled. Accordingly, the first base station may reschedule the URLLC data or control information in at least one subslot 850 of the subframe t+1 812. In an aspect, the URLLC data or control information may be carried in the bundled subslots 820, but may be rescheduled during one subslot 850, for example, because a same number of bits indicating the URLLC data or control information may be carried in the subslot 850 using a different coding rate.

In the eMBB cell 804, a second base station (e.g., the second base station 404) may determine, based on the NACK 830, that the second base station is to reduce transmission power during at least a first portion 806b of the subframe t+1 812, for example, in order to mitigate interference to the URLLC data or control information communicated to the UE. Accordingly, the second base station may reduce transmission power (e.g., perform power fallback or yield transmission) during a first portion 806b of the subframe t+1 812.

The first base station may then transmit the rescheduled URLLC data or control information (e.g., the rescheduled second type of data or control information 424) during the subslot 850 of the subframe t+1 812. Because the second base station may perform power fallback during the first portion 806b of the subframe t+1 812, the UE may be able to successfully decode the rescheduled URLLC data or control information. In one aspect, URLLC applications in the URLLC/eMBB cell 802 may be budgeted a delay period (e.g., 500 microseconds), for example, so that the URLLC data or control information still adheres to the latency requirements of URLLC.

Figure 9:
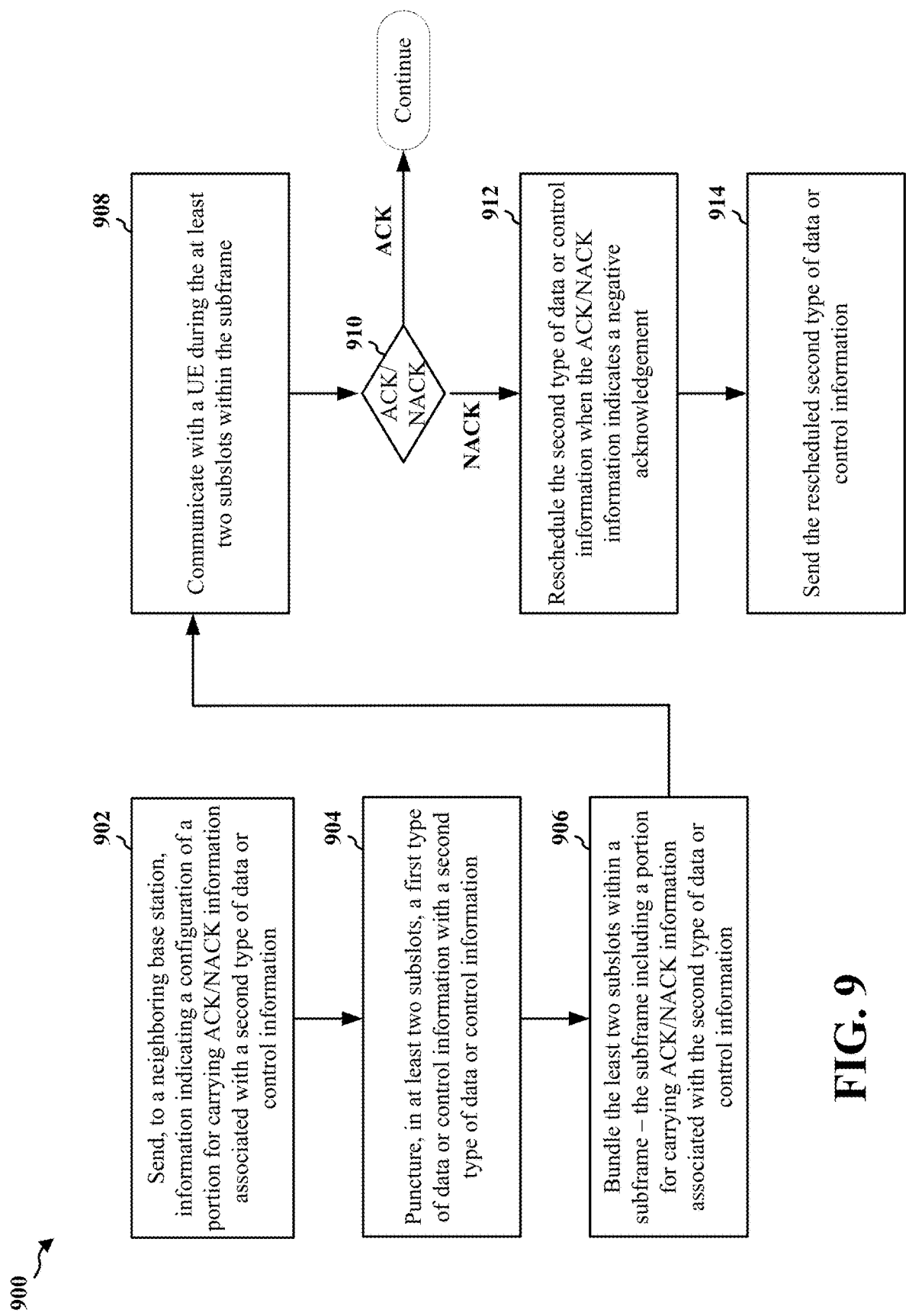
FIG. 9 is a flowchart of a method of wireless communication.

FIG. 9 is a flowchart of a method 900 of wireless communication. The method may be performed by a base station (e.g., the base station 102, the base station 402, the apparatus 1002/1002'). While the method 900 illustrates a plurality of discrete operations, the present disclosure contemplates aspects in which one or more operations are transposed, omitted, and/or contemporaneously performed.

Beginning first with operation 902, the base station may send, to a neighboring base station, information indicating a configuration of a portion for carrying ACK/NACK information associated with a second type of data or control information. The configuration information may include one or more resources on which ACK/NACK information associated with the second type of data or control information is to be carried. In one aspect, the second type of data or control information may be URLLC data or control information. In the context of FIG. 4, the first base station 402 may send, to the second base station 404, information 440 indicating a configuration of a portion for carrying ACK/NACK information, for example, so that the second base station 404 may monitor for and detect the ACK/NACK information 422.

At operation 904, the base station may puncture, in at least two subslots, a first type of data or control information with a second type of data or control information. For example, the base station may map the first type of data or control information to one or more resources (e.g., RBs), but at least a portion of the bits of those resources may be used to carry the second type of data or control information—e.g., the base station may map the second type of data or control information over the first type of data or control information in one or more resources. In an aspect, the first type of data or control information may be eMBB data or control information, and the second type of data or control information may be URLLC data or control information. In the context of FIG. 4, the first base station 402 may puncture a first type of data or control information with a second type of data or control information 420. For example, the first base station 402 may puncture 742 the first portion 718 of a subframe 710 with the second type of data or control information determined from the URLLC packet 740. In another example, the first base station 402 may puncture the first portion 818 of a subframe t 810 with URLLC data or control information determined from the URLLC packet 840.

At operation 906, the base station may bundle the at least two subslots within a subframe. For example, the base station may include the second type of data or control information in a first subslot, and may also include the second type of data or control information in a second subslot. The second type of data or control information in the second subslot may be a redundancy version of the second type of data or control information in the first subslot. The base station may then include both of these subslots in a subframe, for example, with the second subslot immediately following the first subslot (e.g., no intervening portions). In an aspect, the subframe may include a portion for carrying ACK/NACK information associated with the second type of data or control information. In the context of FIG. 4, the first base station 402 may bundle at least two subslots in which the second type of data or control information 420 is punctured. For example, the first base station 402 may bundle the subslots 722a, 722b, 722c, 722d within the subframe 710. In another example, the second type of data or control information may be carried in the bundled subslots 820.

At operation 908, the base station may communicate with a UE during the at least two subslots bundled within the subframe. For example, the base station may transmit the second type of data or control information in the bundled at least two subslots within the subframe. In the context of FIG. 4, the first base station 402 may transmit the second type of data or control information 420 during at least two subslots bundled within a subframe. For example, the first base station 402 may transmit the second type of data or control information 420 during the bundle 720. In another example, the first base station 402 may transmit the second type of data or control information 420 during the bundled subslots 820.

At operation 910, the base station may receive, from the UE, ACK/NACK information associated with the second type of data or control information carried in the bundled at least two subslots. In one aspect, the ACK/NACK information may be carried on an UCB channel. In the context of FIG. 4, the first base station 402 may receive, from the first UE 408, ACK/NACK information 422. For example, the first base station 402 may receive ACK/NACK information 730 carried in the portion 726 at the end of the subframe 710. In another example, the first base station 402 may receive ACK/NACK information that is a NACK 830 carried on an UCB channel 860.

If the ACK/NACK information indicates an acknowledgement, then the base station may continue to further communicate with the UE, for example, because the UE successfully decoded the second type of data or control information. However, if the ACK/NACK information indicates a negative acknowledgement, then the method 900 may proceed to operation 912. At operation 912, the base station may reschedule the second type of data or control information. For example, the base station may determine a subsequent time (e.g., a subsequent subframe) for sending the second type of data or control information, and the base station may map the second type of data or control information to resources corresponding to that subsequent time. In the context of FIG. 4, the first base station 402 may reschedule the second type of data or control information 424. For example, the first base station 402 may reschedule URLLC data or control information, determined from the URLLC packet 840, during the at least one subslot 850.

At operation 914, the base station may send the rescheduled second type of data or control information. In the context of FIG. 4, the first base station 402 may send the rescheduled second type of data or control information 424. For example, the first base station 402 may send URLLC data or control information, determined from the URLLC packet 840, during the at least one subslot 850.

Figure 10:
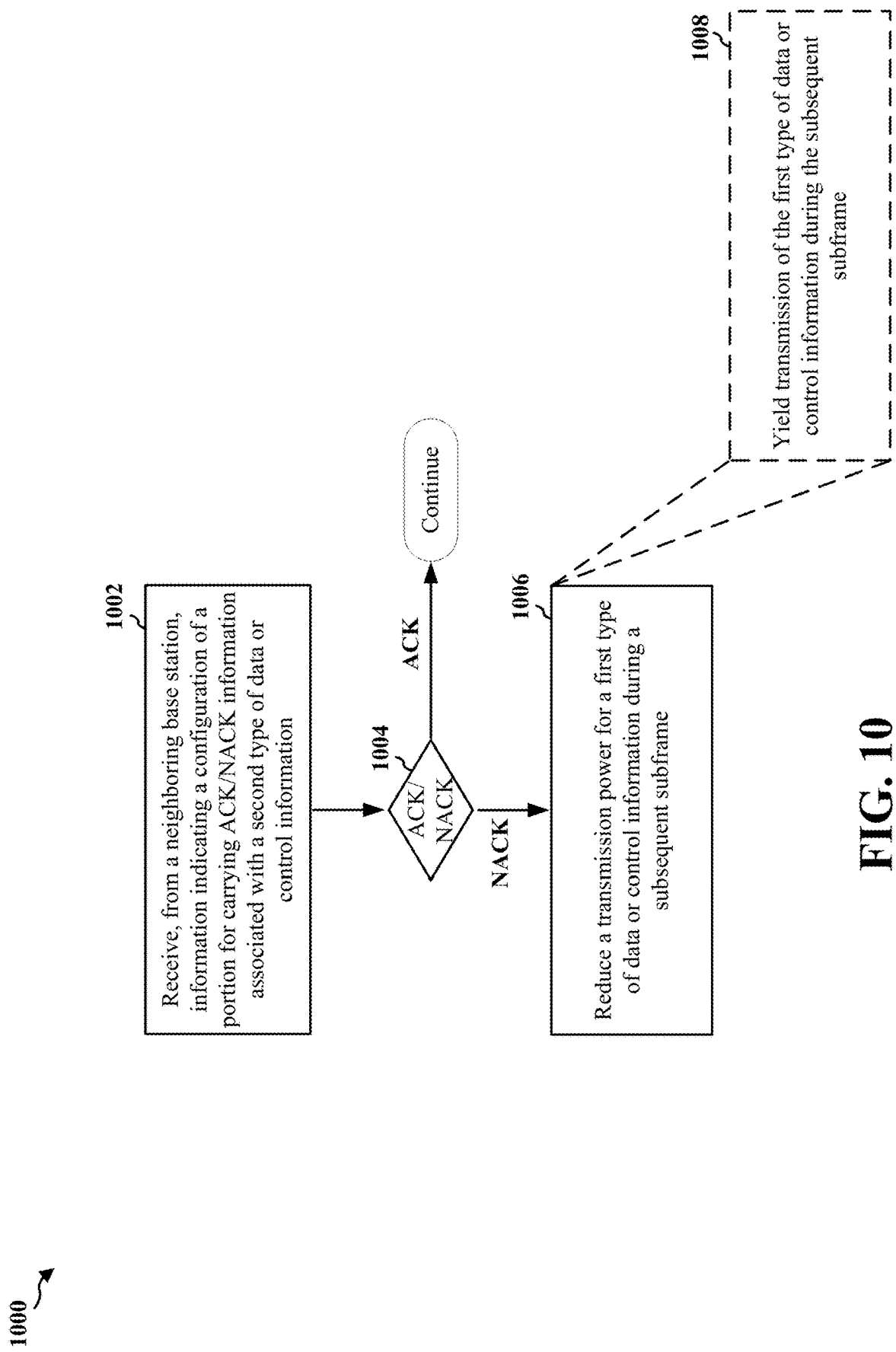
FIG. 10 is a flowchart of a method of wireless communication.

FIG. 10 is a flowchart of a method 1000 of wireless communication. The method may be performed by a base station (e.g., the base station 180, the base station 404, the apparatus 1402/1402'). While the method 1000 illustrates a plurality of discrete operations, the present disclosure contemplates aspects in which one or more operations are transposed, omitted, and/or contemporaneously performed.

Beginning first with operation 1002, the base station may receive, from a neighboring base station, information indicating a configuration of a portion for carrying ACK/NACK information associated with a second type of data or control information. The configuration information may include one or more resources on which ACK/NACK information associated with the second type of data or control information is to be carried (e.g., a last symbol of subframe, a UCB channel). In one aspect, the second type of data or control information may be URLLC data or control information. In the context of FIG. 4, the second base station 404 may receive, from the first base station 402, information 440 indicating a configuration of a portion for carrying ACK/NACK information, for example, so that the second base station 404 may monitor for and detect the ACK/NACK information 422.

At operation 1004, the base station may receive, from a UE, ACK/NACK information associated with the second type of data or control information, e.g., based on the received configuration information. In one aspect, the ACK/NACK information may be carried on an UCB channel. In the context of FIG. 4, the second base station 404 may receive, from the first UE 408, ACK/NACK information 422. For example, the second base station 404 may receive ACK/NACK information that is a NACK 830 carried on an UCB channel 860.

If the ACK/NACK information indicates an acknowledgement (or if no ACK/NACK information is detected), then the base station may continue to further communicate with other UE(s) operating on a cell provided by the base station UE, for example, because the base station has not received an indication that the base station is causing interference to a neighboring cell. However, if the ACK/NACK information indicates a negative acknowledgement, then the method 1000 may proceed to operation 1006. At operation 1006, the base station may reduce a transmission power for a first type of data or control information during a subsequent subframe. For example, the base station may select or compute a reduced transmission power that is relatively less than a previously used transmission power, and the base station may use the reduced transmission power for transmission. The first type of data or control information may be eMBB data or control information. In the context of FIG. 4, the second base station 404 may reduce a transmission power for a first type of data or control information 442. For example, the second base station 404 may reduce a transmission power during a first portion 806b of the subframe t+1 812.

In one aspect, operation 1006 may include operation 1008. At operation 1008, the base station may yield transmission of the first type of data or control information during the subsequent subframe. In an aspect, the base station may yield transmission by refraining from transmitting data or control information (e.g., data or control information that was otherwise scheduled for transmission). For example, the base station may schedule transmission of the first type of data or control information on one or more resources of the subsequent subframe, and then the base station may refraining from sending the scheduled first type of data or control information on the one or more resources of the subsequent subframe. For example, the second base station 404 may yield transmission of a first type of data or control information 442 until after transmission of the rescheduled second type of data or control information 424. For example, the second base station 404 may yield transmission during a first portion 806b of the subframe t+1 812.

Figure 11:
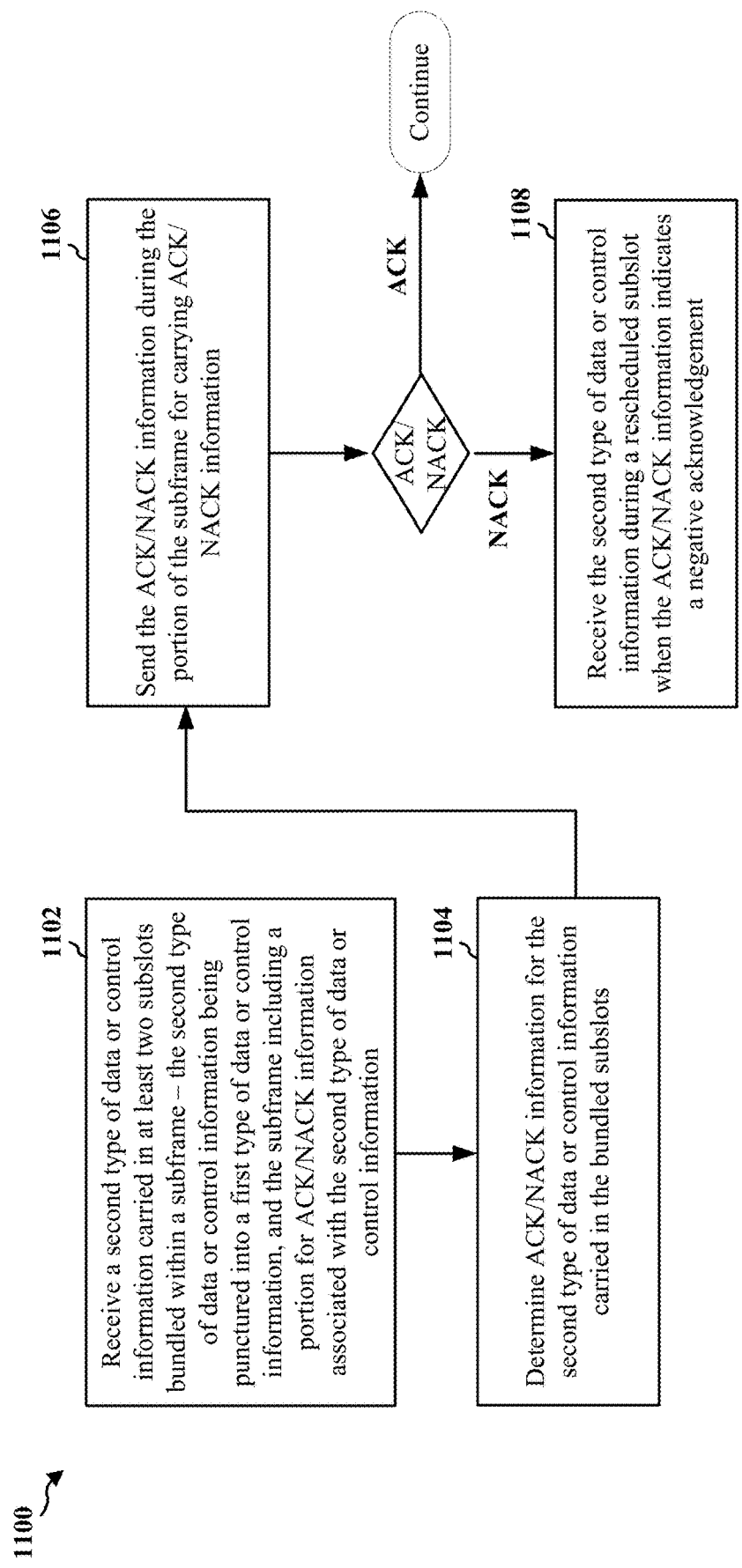
FIG. 11 is a flowchart of a method of wireless communication.

FIG. 11 is a flowchart of a method 1100 of wireless communication. The method may be performed by a UE (e.g., the UE 104, the first UE 408, the apparatus 1602/1602'). While the method 1100 illustrates a plurality of discrete operations, the present disclosure contemplates aspects in which one or more operations are transposed, omitted, and/or contemporaneously performed.

At operation 1102, the UE may receive, from a base station, a second type of data or control information carried in at least two subslots bundled within a subframe. In an aspect, the second type of data or control information is punctured into a first type of data or control information. In an aspect, the subframe includes a portion for carrying ACK/NACK information associated with the second type of data or control information. The first type of data or control information may be eMBB data or control information, and the second type of data or control information may be URLLC data or control information.

In the context of FIG. 4, the first UE 408 may receive the second type of data or control information 420. For example, the first UE 408 may receive the second type of data or control information that is punctured 742 into symbols of the first portion 718 of a subframe 710. In another example, the first UE 408 may receive the second type of data or control information that is punctured into symbols of the first portion 818 of a subframe t 810. The first UE 408 may receive the second type of data or control information carried in the subslots 722a, 722b, 722c, 722d of the bundle 720. In another example, the second type of data or control information may be carried in the bundled subslots 820.

At operation 1104, the UE may determine ACK/NACK information for the second type of data or control information carried in the bundled at least two subslots. For example, the UE may attempt to decode the second type of data or control information. If the UE successfully decodes the second type of data or control information, then the UE may generate ACK feedback to indicate the successful reception and decoding of the second type of data or control information. However, if the UE is unsuccessful in decoding the second type of data or control information, then the UE may generate NACK feedback to indicate the failure in reception and/or decoding of the second type of data or control information. In the context of FIG. 4, the first UE 408 may determine the ACK/NACK information 422 for the second type of data or control information 420. For example, the first UE 408 may determine the ACK/NACK information 730 for URLLC data or control information carried in the bundle 720. In another example, the first UE 408 may determine the NACK 830 when the first UE 408 is unable to successfully decode the URLLC data or control information carried in the bundled subslots 820.

At operation 1106, the UE may send the ACK/NACK information during the portion of the subframe for carrying ACK/NACK information. In an aspect, the ACK/NACK information may be carried on a UCB channel. In the context of FIG. 4, the first UE 408 may send the ACK/NACK information 422, which may be received by both the first base station 402 and the second base station 404. For example, the first UE 408 may send the ACK/NACK information 730 in the portion 726 of the subframe 710 for carrying ACK/NACK information. In another example, the first UE 408 may send the NACK 830, which may be received in both the URLLC/eMBB cell 802 and the eMBB cell 804.

If the UE sends a NACK, the method 1100 may proceed to operation 1108. At operation 1108, the UE may receive a rescheduled second type of data or control information. In the context of FIG. 4, the first UE 408 may receive the rescheduled second type of data or control information 424. For example, the first UE 408 may receive the rescheduled second type of data or control information carried in the at least one subslot 850 of the subframe t+1 812.

Figure 12:
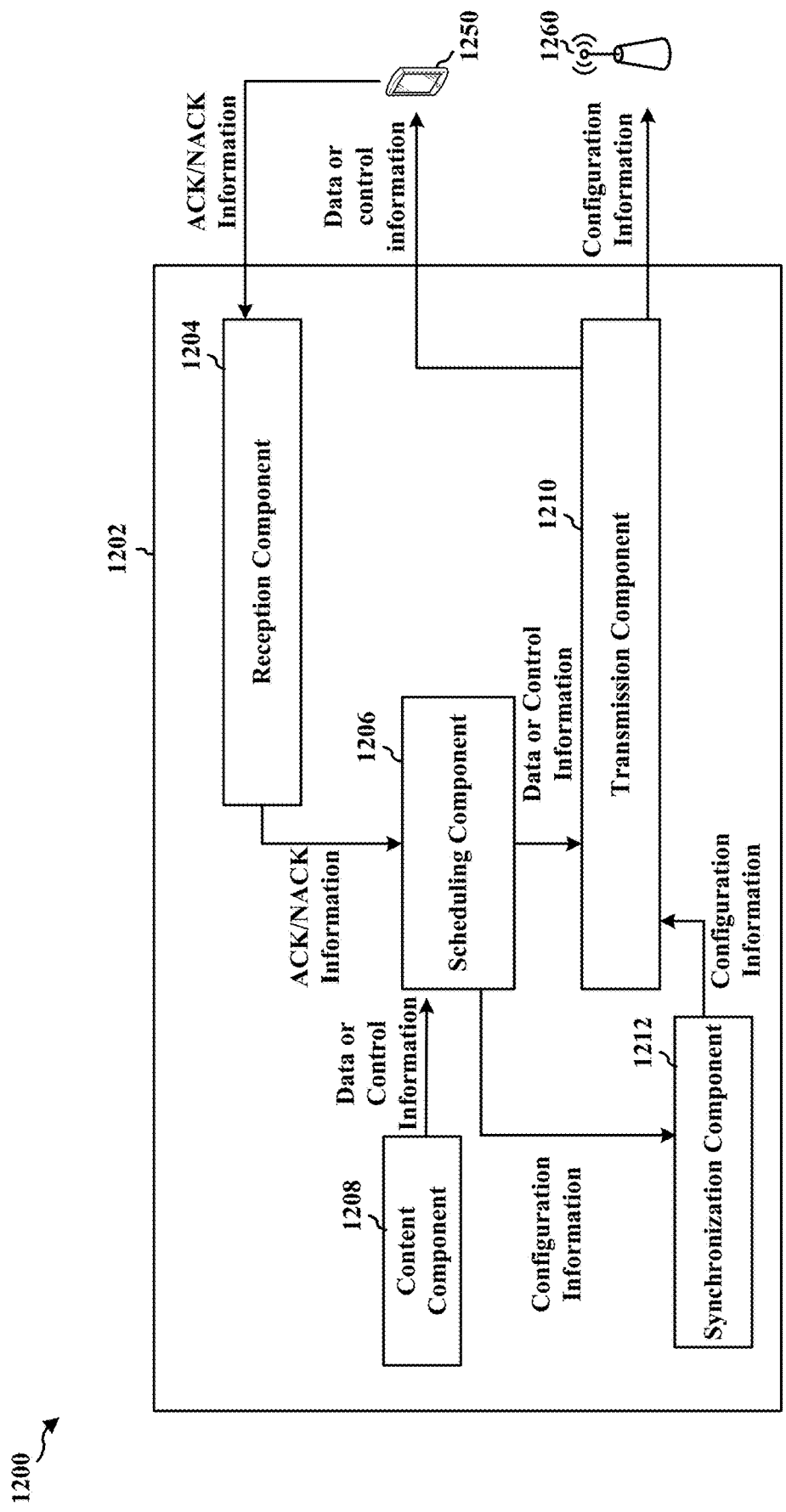
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station.

The apparatus 1202 may include a reception component 1204 configured to receive signals (e.g., from a UE 1250 and/or from a neighboring base station 1260). The apparatus 1202 may include a transmission component 1210 configured to transmit signals (e.g., to the UE 1250 and/or to a neighboring base station 1260).

The apparatus 1202 may include a content component 1208 configured to determine content that is to be delivered to the UE 1250. The content may include URLLC data or control information. The content component 1208 may provide the content to the scheduling component 1206. The scheduling component 1206 may puncturing, in at least two subslots, a first type of data or control information (e.g., eMBB data or control information) with the content, which may be a second type of data or control information (e.g., URLLC data or control information). In an aspect, the scheduling component 1206 may bundling the at least two subslots within a subframe. In an aspect, the subframe may include a portion for carrying ACK/NACK information associated with the second type of data or control information. The transmission component 1210 may then communicate with the UE 1250 during the at least two subslots bundled within the subframe.

In an aspect, the scheduling component 1206 may receive, from the UE 1250, ACK/NACK information associated with the content, which may be carried on a UCB channel. If the ACK/NACK information indicates a negative acknowledgement by the UE 1250, the scheduling component 1206 may reschedule the content (e.g., during a subslot of a next subframe). The transmission component 1210 may then send the rescheduled second type of data or control information to the UE 1250.

In an aspect, the apparatus 1202 may include a synchronization component 1212. The synchronization component 1212 may be configured to determine information indicating a configuration of a portion for carrying ACK/NACK information associated with a second type of data or control information. The configuration information may include one or more resources on which ACK/NACK information associated with the second type of data or control information is to be carried (e.g., a last symbol of subframe, a UCB channel). The transmission component 1210 may then transmit, to the neighboring base station 1260, information indicating a configuration of a portion for carrying ACK/NACK information, for example, so that the neighboring base station may monitor for and detect the ACK/NACK information from the UE 1250.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
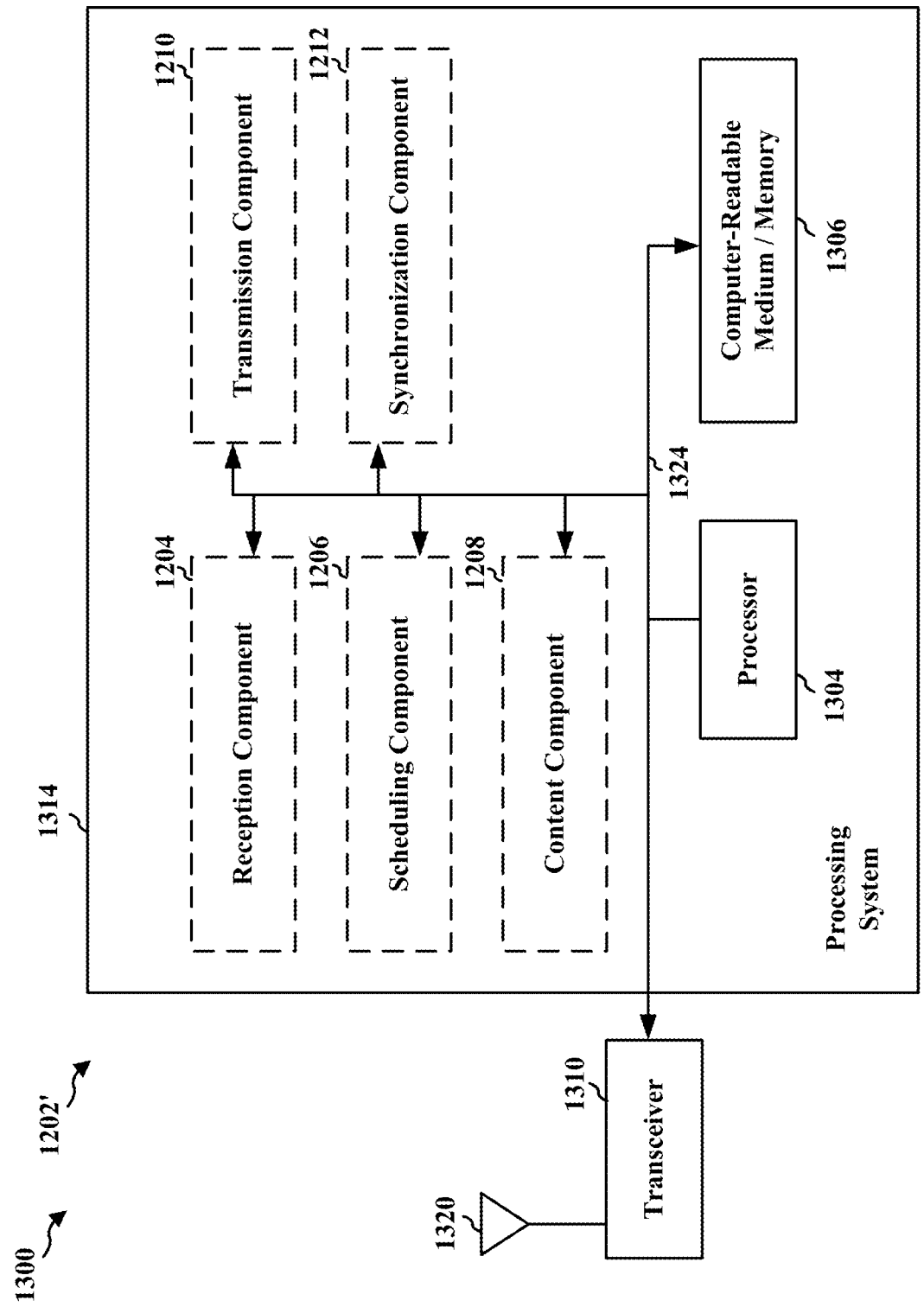
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for puncturing, in at least two subslots, a first type of data or control information with a second type of data or control information. The apparatus 1202/1202' may further include means for bundling the at least two subslots within a subframe, wherein the subframe includes a portion for carrying ACK/NACK information associated with the second type of data or control information. The apparatus 1202/1202' may further include means for communicating with a user equipment (UE) during the at least two subslots bundled within the subframe. The apparatus 1202/1202' may further include means for receiving ACK/NACK information associated with the second type of data or control information carried in the bundled at least two subslots. In an aspect, wherein the ACK/NACK information is carried on an eMBB uplink common burst channel. The apparatus 1202/1202' may further include means for rescheduling the second type of data or control information when the ACK/NACK information indicates a negative acknowledgement. The apparatus 1202/1202' may further include means for sending the rescheduled second type of data or control information. The apparatus 1202/1202' may further include means for sending, to a neighboring base station, information indicating a configuration of the portion for carrying ACK/NACK information associated with the second type of data or control information. In an aspect, the first type of data is associated with eMBB and the second type of data is associated with URLLC.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
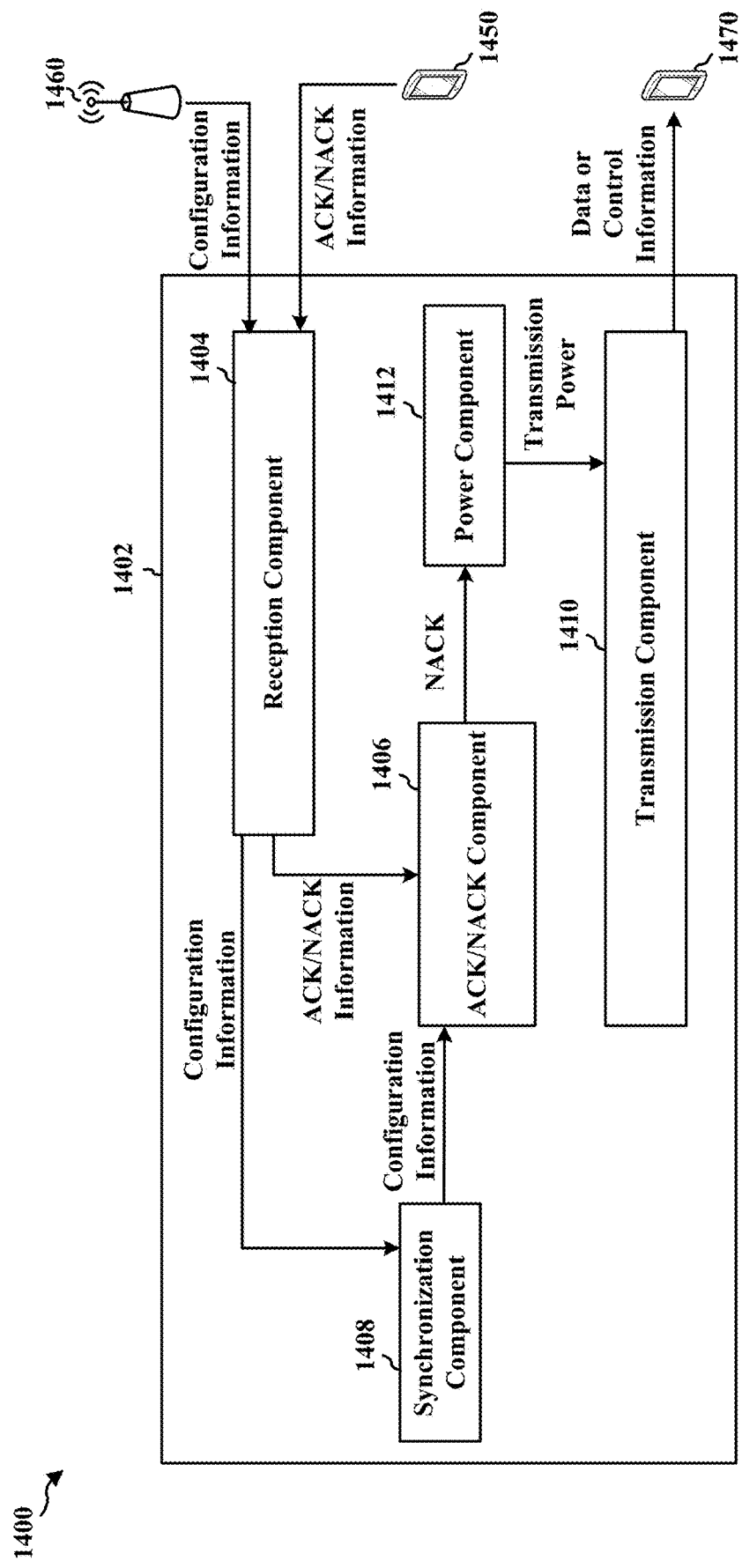
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a base station.

The apparatus 1402 may include a reception component 1404 configured to receive signals (e.g., from a first UE 1450, a second UE 1470, and/or from a neighboring base station 1460). The apparatus 1402 may include a transmission component 1410 configured to transmit signals (e.g., to the second UE 1470 and/or to a neighboring base station 1460).

In an aspect, the apparatus 1202 may include a synchronization component 1408. The synchronization component 1408 may be configured to determine information indicating a configuration of a portion for carrying ACK/NACK information associated with a second type of data or control information, which may be received from the neighboring base station 1460. The configuration information may include one or more resources on which ACK/NACK information associated with the second type of data or control information is to be carried (e.g., a last symbol of subframe, a UCB channel).

The synchronization component 1408 may provide the configuration information to an ACK/NACK component 1406. Based on this configuration information, the ACK/NACK component 1406 may monitor for and detect the ACK/NACK information from the UE 1450. In an aspect, the ACK/NACK information may be carried on a UCB channel; however, the ACK/NACK information may be associated with a second type of data or control information (e.g., URLLC), while the apparatus 1402 is configured to communicate according to a first type of data or control information (e.g., eMBB).

When the ACK/NACK component 1406 detects a NACK from the first UE 1450, the ACK/NACK component 1406 may provide an indication of the NACK to the power component 1412. The power component 1412 may be configured to reduce a transmission power for a first type of data or control information during a subsequent subframe, for example, when communicating with the second UE 1470. In an aspect, the power component 1412 may reduce the transmission power by causing the transmission component 1410 to yield transmission of the first type of data or control information during the subsequent subframe.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
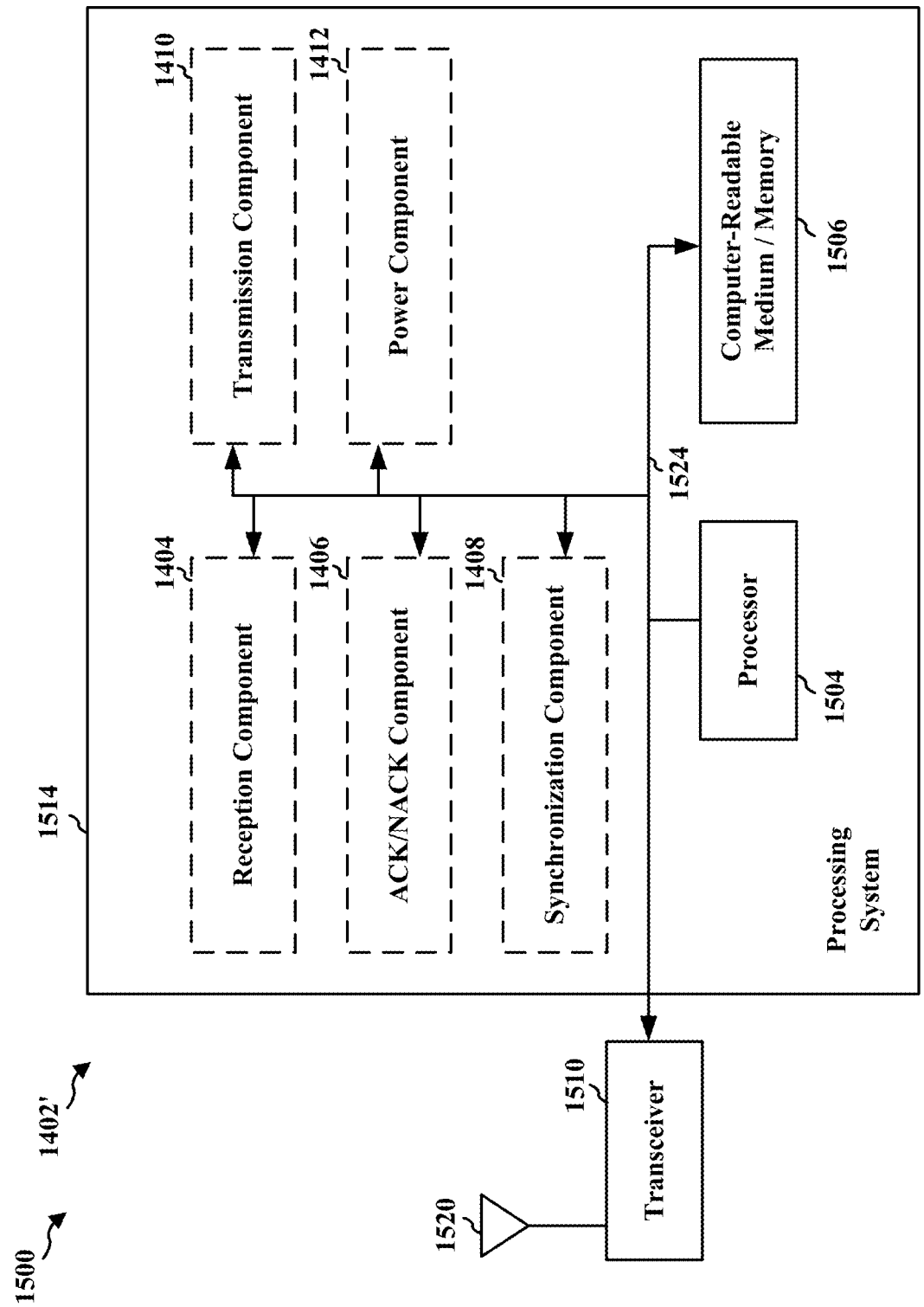
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375.

In one configuration, the apparatus 1402/1402' for wireless communication includes means for receiving ACK/NACK information associated with a second type of data or control information. The apparatus 1402/1402' may further include means for reducing a transmission power for a first type of data or control information during a subsequent subframe when the ACK/NACK information indicates a negative acknowledgement. In an aspect, the means for reducing the transmission power is configured to yield transmission of the first type of data or control information during the subsequent subframe.

The apparatus 1402/1402' may further include means for receiving, from a neighboring base station, information indicating a configuration of a portion of a subframe for carrying the ACK/NACK information. In an aspect, the ACK/NACK information is carried on an eMBB uplink common burst channel. In an aspect, the first type of data is associated with eMBB and the second type of data is associated with URLLC).

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
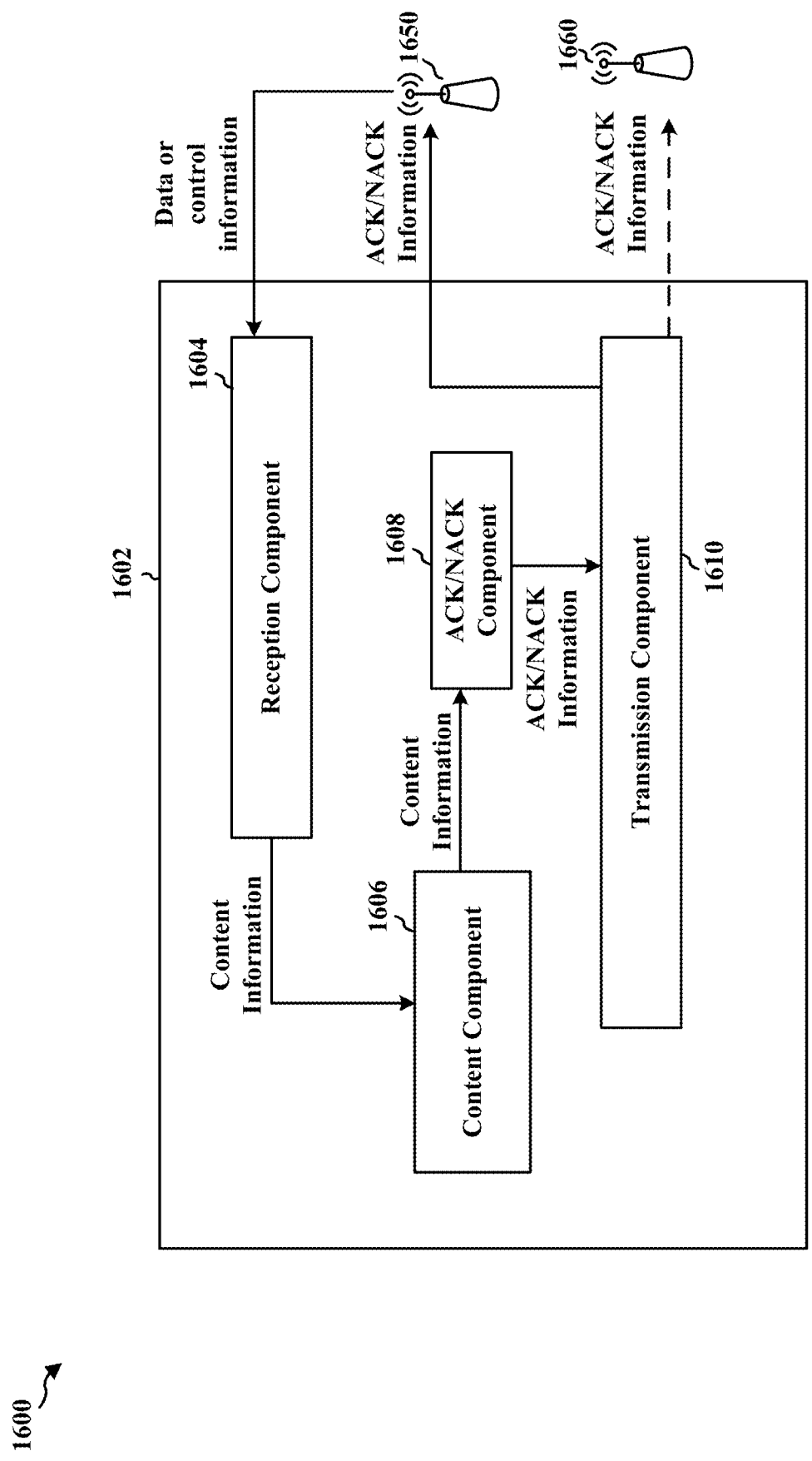
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a UE.

The apparatus 1602 may include a reception component 1604 configured to receive signals (e.g., from a first base station 1650). The apparatus 1402 may include a transmission component 1410 configured to transmit signals (e.g., to the first base station 1650, although such signals may be detected by a neighboring base station 1660).

In an aspect, the apparatus 1602 may include a content component 1606. The content component 1606 may be configured to receive content (e.g., URLLC data or control information) from the first base station 1650, and the content may be carried in bundled subslots of a subframe. In an aspect, the data or control information may be of a second type (e.g., URLLC), and may be punctured, in at least two subslots bundled within a subframe, into a first type of data or control information (e.g., eMBB data or control information). In an aspect, the subframe may include a portion for carrying ACK/NACK information associated with the second type of data or control information.

The content component 1606 may attempt to decode the second type of data or control information received from the first base station 1650 and provide an indication of whether the decoding was successful to an ACK/NACK component 1608. The ACK/NACK component 1608 may determine ACK/NACK information for the bundled subslots in which the second type of data or control information is carried. For example, the ACK/NACK component 1608 may determine an ACK when the content component 1606 successfully decodes the second type of data or control information carried in the bundled subslots, and may determine a NACK otherwise.

The transmission component 1610 may transmit the determined ACK/NACK information in the portion of the subframe for carrying ACK/NACK information. The ACK/NACK information may be carried on a UCB channel. While the ACK/NACK information may be intended for the first base station 1650, the neighboring base station 1660 may detect the ACK/NACK information.

If the ACK/NACK component 1608 causes transmission of a NACK, the content component 1606 may receive the second type of data or control information during a rescheduled subslot, which may occur during the next subframe immediately after the subframe in which the bundled subslots are carried.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for receiving a second type of data or control information carried in at least two subslots bundled within a subframe, and the second type of data or control information is punctured into a first type of data or control information. The subframe may include a portion for carrying ACK/NACK information associated with the second type of data or control information. The apparatus 1602/1602' may further include means for determining ACK/NACK information for the second type of data or control information carried in the bundled at least two subslots. The apparatus 1602/1602' may further include means for sending the ACK/NACK information during the portion of the subframe for carrying ACK/NACK information.

In an aspect, the apparatus 1602/1602' may include means for receiving the second type of data or control information during a rescheduled subslot when the ACK/NACK information indicates a negative acknowledgement. In an aspect, the ACK/NACK information is carried on an eMBB uplink common burst channel. In an aspect, the first type of data is associated with eMBB and the second type of data is associated with URLLC.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Further disclosure is included in the Appendix.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, the method comprising:
puncturing, in at least two subslots, data or control information associated with a first type of traffic with data or control information associated with a second type of traffic;
bundling the at least two subslots within a subframe, wherein the subframe includes a portion for carrying acknowledgment (ACK)/negative acknowledgment (NACK) information associated with the data or control information associated with the second type of traffic; and
communicating with a user equipment (UE) during the at least two subslots bundled within the subframe.

2. The method of claim 1, further comprising:
receiving ACK/NACK information associated with the data or control information associated with the second type of traffic carried in the bundled at least two subslots.

3. The method of claim 2, wherein the ACK/NACK information is carried on an enhanced mobile broadband (eMBB) uplink common burst channel.

4. The method of claim 2, further comprising:
rescheduling the data or control information associated with the second type of traffic when the ACK/NACK information indicates a negative acknowledgement; and
sending the rescheduled data or control information associated with the second type of traffic.

5. The method of claim 1, further comprising:
sending, to a neighboring base station, information indicating a configuration of the portion for carrying the ACK/NACK information associated with the data or control information associated with the second type of traffic.

6. The method of claim 1, wherein the first type of traffic is associated with eMBB and the second type of traffic is associated with ultra-reliable low-latency communication (URLLC).

7. A method of wireless communication by a base station, the method comprising:
receiving acknowledgment (ACK)/negative acknowledgment (NACK) information associated with data or control information associated with a second type of traffic, the received ACK/NACK information intended for a neighboring base station; and
reducing a transmission power for data or control information associated with a first type of traffic transmitted by the base station during a subsequent subframe when the ACK/NACK information intended for the neighboring base station and associated with data or control information associated with the second type of traffic indicates a negative acknowledgement.

8. The method of claim 7, wherein the reduction of the transmission power comprises:
yielding transmission of the data or control information associated with the first type of traffic during the subsequent subframe.

9. The method of claim 7, further comprising:
receiving, from the neighboring base station, information indicating a configuration of a portion of a subframe for carrying the ACK/NACK information.

10. The method of claim 7, wherein the ACK/NACK information is carried on an enhanced mobile broadband (eMBB) uplink common burst channel.

11. The method of claim 7, wherein the first type of traffic is associated with eMBB and the second type of traffic is associated with ultra-reliable low-latency communication (URLLC).

12. A method of wireless communication by a user equipment (UE), the method comprising:
receiving data or control information associated with a second type of traffic carried in at least two subslots bundled within a subframe, wherein the data or control information is punctured into data or control information associated with a first type of traffic, and wherein the subframe includes a portion for carrying acknowledgment (ACK)/negative acknowledgment (NACK) information associated with the data or control information associated with the second type of traffic;
determining ACK/NACK information for the data or control information associated with the second type of traffic carried in the bundled at least two subslots; and
sending the ACK/NACK information during the portion of the subframe for carrying ACK/NACK information.

13. The method of claim 12, further comprising:
receiving the data or control information associated with the second type of traffic during a rescheduled subslot when the ACK/NACK information indicates a negative acknowledgement.

14. The method of claim 12, wherein the ACK/NACK information is carried on an enhanced mobile broadband (eMBB) uplink common burst channel.

15. The method of claim 12, wherein the first type of traffic is associated with eMBB and the second type of traffic is associated with ultra-reliable low-latency communication (URLLC).

16. An apparatus for wireless communication by a base station, the apparatus comprising:
a memory; and
at least one processor coupled to the memory and configured to:
puncture, in at least two subslots, data or control information associated with a first type of traffic with data or control information associated with a second type of traffic;
bundle the at least two subslots within a subframe, wherein the subframe includes a portion for carrying acknowledgment (ACK)/negative acknowledgment (NACK) information associated with the data or control information associated with the second type of traffic; and
communicate with a user equipment (UE) during the at least two subslots bundled within the subframe.

17. The apparatus of claim 16, wherein the at least one processor is further configured to:
receive ACK/NACK information associated with the data or control information associated with the second type of traffic carried in the bundled at least two subslots.

18. The apparatus of claim 17, wherein the ACK/NACK information is carried on an enhanced mobile broadband (eMBB) uplink common burst channel.

19. The apparatus of claim 17, wherein the at least one processor is further configured to:
reschedule the data or control information associated with the second type of traffic when the ACK/NACK information indicates a negative acknowledgement; and
send the rescheduled data or control information associated with the second type of traffic.

20. The apparatus of claim 16, wherein the at least one processor is further configured to:
send, to a neighboring base station, information indicating a configuration of the portion for carrying the ACK/NACK information associated with the data or control information associated with the second type of traffic.

21. The apparatus of claim 16, wherein the first type of traffic is associated with eMBB and the second type of traffic is associated with ultra-reliable low-latency communication (URLLC).

22. The apparatus of claim 16, wherein the at least one processor is further configured to:
receive a second ACK/NACK information associated with another UE operating on another cell;
reduce a transmission power for the data or control information associated with the first type of traffic during a subsequent subframe when the second ACK/NACK information indicates a negative acknowledgement.

23. The apparatus of claim 22, wherein the reduction of the transmission power comprises:
yielding transmission of the data or control information associated with the first type of traffic during the subsequent subframe.

24. The apparatus of claim 22, wherein the at least one processor is further configured to:
receive, from a neighboring base station, information indicating a configuration of a portion of a subframe for carrying the ACK/NACK information.

25. The apparatus of claim 22, wherein the ACK/NACK information is carried on an enhanced mobile broadband (eMBB) uplink common burst channel.

26. The apparatus of claim 22, wherein the first type of traffic is associated with eMBB and the second type of traffic is associated with ultra-reliable low-latency communication (URLLC).

27. An apparatus for wireless communication by a base station, the apparatus comprising:
a memory; and
at least one processor coupled to the memory and configured to:
receive acknowledgment (ACK) / negative acknowledgment (NACK) information associated with data or control information associated with a second type of traffic, the received ACK/NACK information intended for a neighboring base station; and
reduce a transmission power for data or control information associated with a first type of traffic transmitted by the base station during a subsequent subframe when the ACK/NACK information intended for the neighboring base station and associated with data or control information associated with the second type of traffic indicates a negative acknowledgement.

28. The apparatus of claim 27, wherein to reduce the transmission power, the at least one processor is configured to:
yield transmission of the data or control information associated with the first type of traffic during the subsequent subframe.

29. The apparatus of claim 27, wherein the at least one processor is further configured to:
receive, from the neighboring base station, information indicating a configuration of a portion of a subframe for carrying the ACK/NACK information.

30. The apparatus of claim 27, wherein the ACK/NACK information is carried on an enhanced mobile broadband (eMBB) uplink common burst channel.

31. The apparatus of claim 27, wherein the first type of traffic is associated with eMBB and the second type of traffic is associated with ultra-reliable low-latency communication (URLLC).

32. An apparatus for wireless communication by a user equipment (UE), the apparatus comprising:
a memory; and
at least one processor coupled to the memory and configured to:
receive data or control information associated with a second type of traffic carried in at least two subslots bundled within a subframe, wherein the data or control information is punctured into data or control information associated with a first type of traffic, and wherein the subframe includes a portion for carrying acknowledgment (ACK) / negative acknowledgment (NACK) information associated with the data or control information associated with the second type of traffic;
determine ACK/NACK information for the data or control information associated with the second type of traffic carried in the bundled at least two subslots; and
send the ACK/NACK information during the portion of the subframe for carrying ACK/NACK information.

33. The apparatus of claim 32, wherein the at least one processor is further configured to:
receive the data or control information associated with the second type of traffic during a rescheduled subslot when the ACK/NACK information indicates a negative acknowledgement.

34. The apparatus of claim 32, wherein the ACK/NACK information is carried on an enhanced mobile broadband (eMBB) uplink common burst channel.

35. The apparatus of claim 32, wherein the first type of traffic is associated with eMBB and the second type of traffic is associated with ultra-reliable low-latency communication (URLLC).

* * * * *